(12) United States Patent
Shrivastava et al.

(10) Patent No.: US 11,320,975 B2
(45) Date of Patent: May 3, 2022

(54) AUTOMATICALLY GENERATING AND APPLYING GRAPHICAL USER INTERFACE RESIZE-CONSTRAINTS BASED ON DESIGN SEMANTICS

(71) Applicant: Adobe Inc., San Jose, CA (US)

(72) Inventors: Swapnil Shrivastava, Foster City, CA (US); Hoyle Wang, San Francisco, CA (US); Ash Huang, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 3 days.

(21) Appl. No.: 16/279,449

(22) Filed: Feb. 19, 2019

(65) Prior Publication Data

US 2020/0089396 A1 Mar. 19, 2020

Related U.S. Application Data

(60) Provisional application No. 62/731,965, filed on Sep. 16, 2018.

(51) Int. Cl.
*G06F 3/04845* (2022.01)
*G06T 11/60* (2006.01)
(Continued)

(52) U.S. Cl.
CPC ............ *G06F 3/04845* (2013.01); *G06F 8/38* (2013.01); *G06T 11/60* (2013.01); *G06F 40/106* (2020.01)

(58) Field of Classification Search
CPC .......... G06F 8/38; G06F 40/106; G06F 9/451; G06F 3/04845; G06T 11/60
(Continued)

(56) References Cited

U.S. PATENT DOCUMENTS 5,633,997 A * 5/1997 Barber ...................... G01J 3/02
345/440
8,392,841 B1 * 3/2013 Bowden .................. G06F 16/95
715/760
(Continued)

OTHER PUBLICATIONS

Combined Search and Examination Report as received in UK application GB1910085.8 dated Dec. 19, 2019.
(Continued)

*Primary Examiner* — Daniel Samwel
(74) *Attorney, Agent, or Firm* — Keller Preece PLLC

(57) ABSTRACT

The present disclosure is directed toward systems, methods, and non-transitory computer readable media that resize a graphical user interface design layout using automatically-generated semantic-aware resize constraints. In particular, systems described herein can analyze the semantics of graphical user interface design elements (e.g., including size, position, type, etc.) and relative positions of the design elements (e.g., hierarchy, offsets, nesting, etc.). The disclosed systems utilizes a heuristics system to the analyzed semantics to generate a set of automatically-defined semantic-aware resize constraints for each graphical user interface design interface. The disclosed systems additionally present a design resize interface that enables designer to manually select constraints to be applied to the design elements. The disclosed systems can toggle between applying manually-selected and automatic semantic-aware resize constraints for the design elements.

20 Claims, 18 Drawing Sheets

(51) Int. Cl.
*G06F 8/38* (2018.01)
*G06F 40/106* (2020.01)

(58) Field of Classification Search
USPC .................................................. 715/700–866
See application file for complete search history.

(56) References Cited

U.S. PATENT DOCUMENTS

| | | | | |
|---|---|---|---|---|
| 9,933,929 | B1* | 4/2018 | Pitsillides | G06F 3/04842 |
| 2008/0218532 | A1* | 9/2008 | Young | G06F 9/451 |
| | | | | 345/660 |
| 2008/0256439 | A1* | 10/2008 | Boreham | G06F 40/103 |
| | | | | 715/246 |
| 2008/0256440 | A1* | 10/2008 | Boreham | G06F 40/103 |
| | | | | 715/247 |
| 2011/0141142 | A1* | 6/2011 | Leffert | G06F 3/04883 |
| | | | | 345/659 |
| 2011/0210986 | A1* | 9/2011 | Goutsev | G06F 8/38 |
| | | | | 345/672 |
| 2013/0332869 | A1* | 12/2013 | Ferry | G06F 3/04845 |
| | | | | 715/765 |
| 2014/0368547 | A1* | 12/2014 | Elings | G06F 3/04886 |
| | | | | 345/659 |
| 2015/0346954 | A1* | 12/2015 | Parag | G09G 5/373 |
| | | | | 715/763 |
| 2017/0337321 | A1* | 11/2017 | Hoford | G06F 8/34 |

OTHER PUBLICATIONS

Intention to Grant as received in UK application GB1910085.8 dated Jan. 4, 2021.
Examination Report as received in Australian application 2019205973 dated Sep. 29, 2021.
Examination Report as received in Australian application 2019205973 dated Oct. 27, 2021.

* cited by examiner

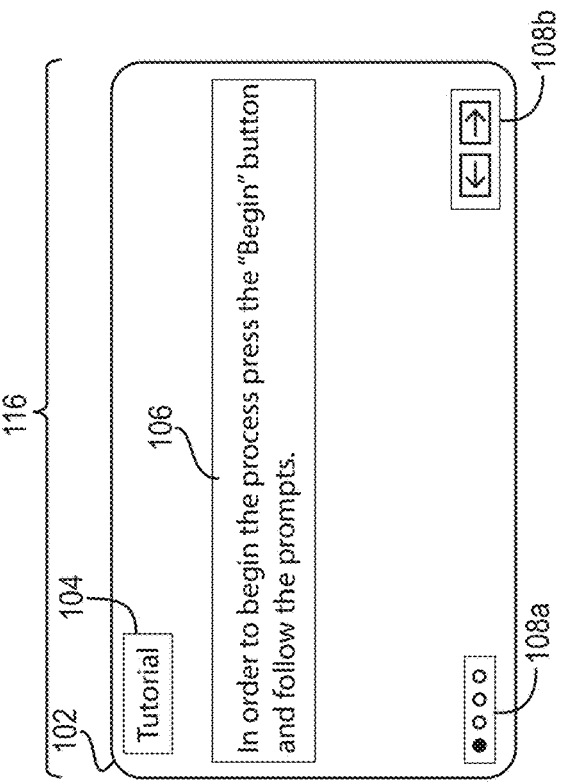
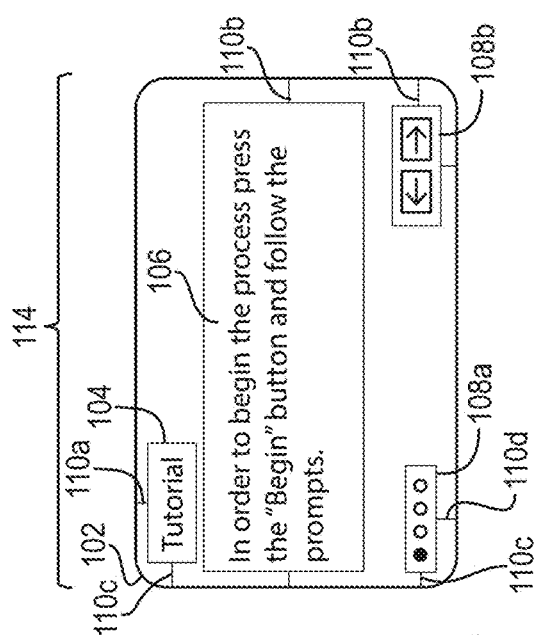
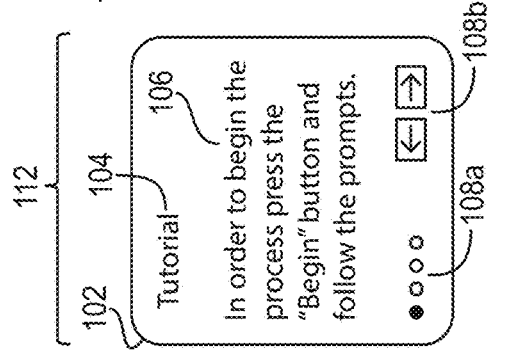

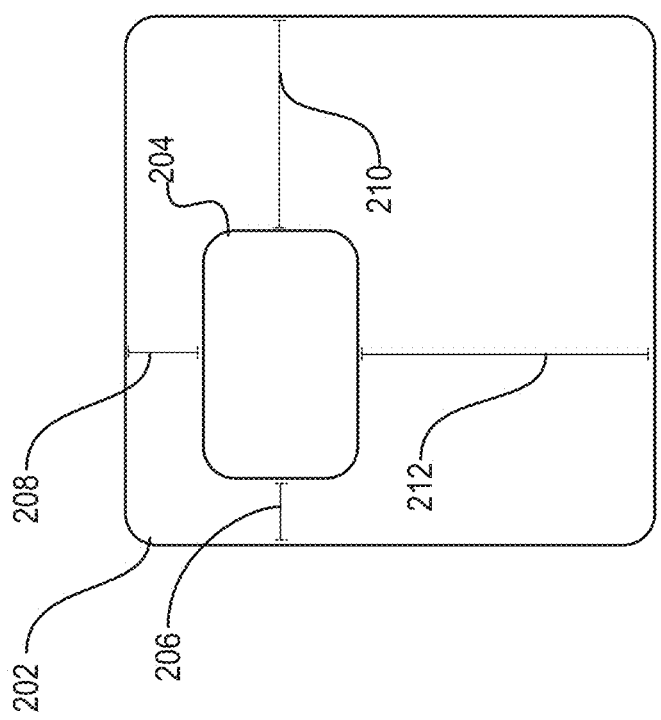

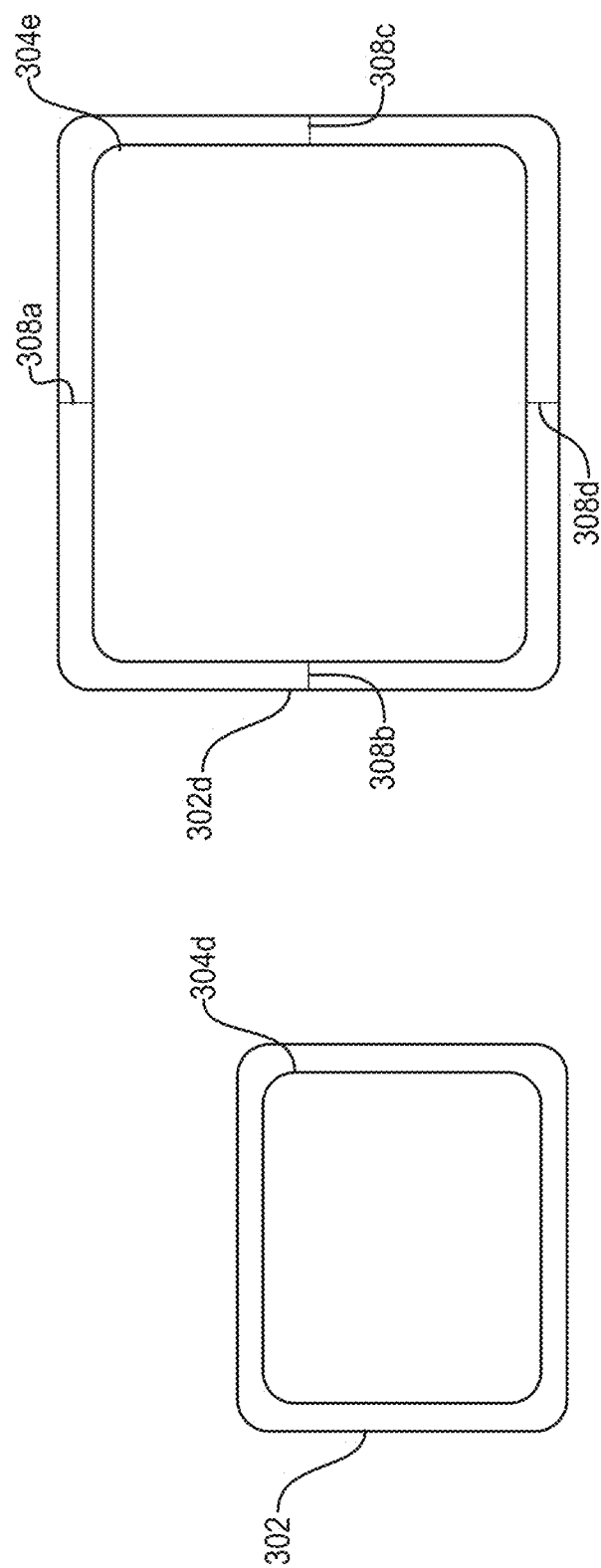

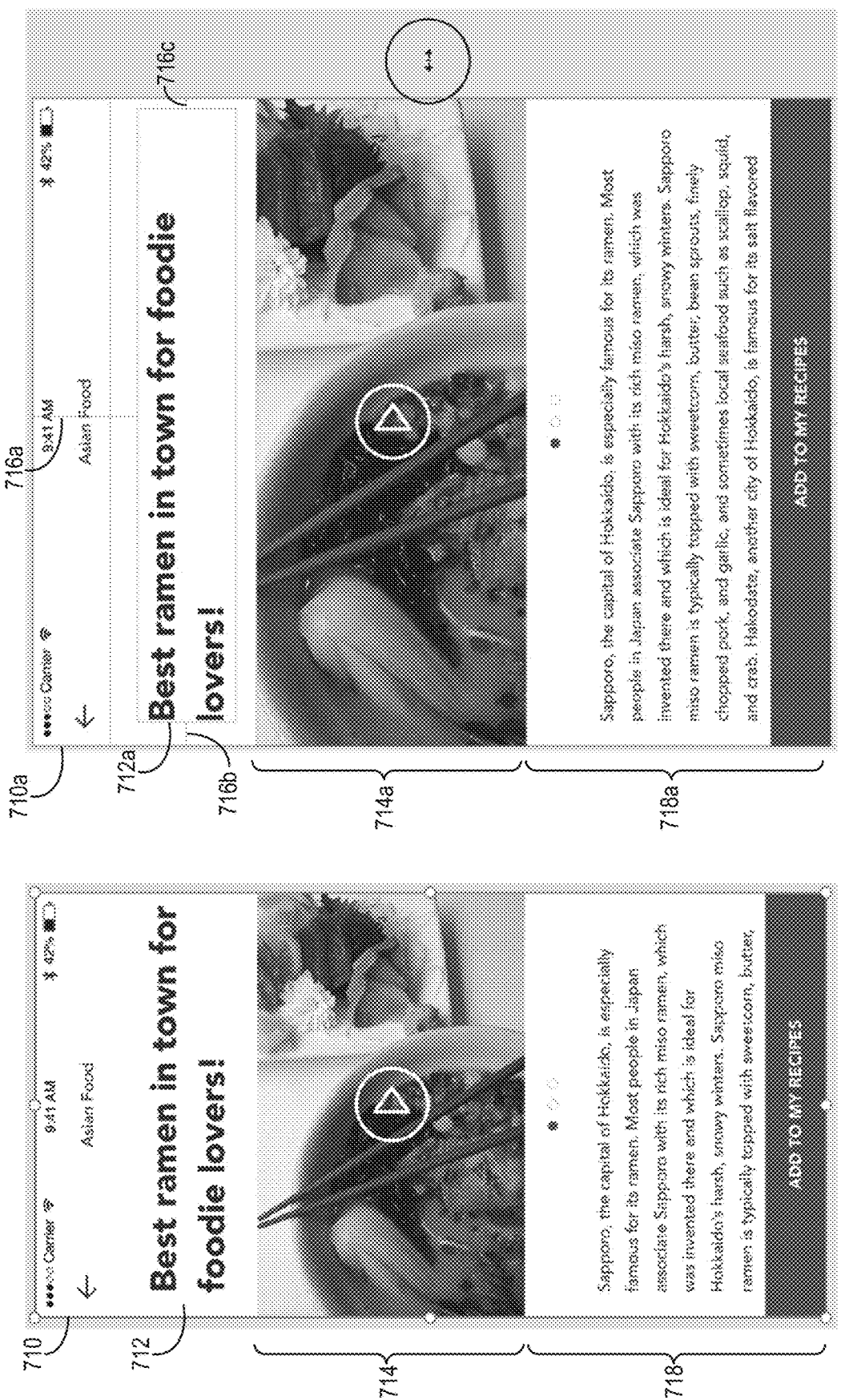

AUTOMATICALLY GENERATING AND APPLYING GRAPHICAL USER INTERFACE RESIZE-CONSTRAINTS BASED ON DESIGN SEMANTICS

CROSS REFERENCE TO RELATED APPLICATIONS

This application claims the benefit of priority to U.S. Provisional Patent Application No. 62/731,965, filed Sep. 16, 2018, and titled AUTOMATICALLY GENERATING AND APPLYING GRAPHICAL USER INTERFACE RESIZE-CONSTRAINTS BASED ON DESIGN SEMANTICS, which is incorporated herein by reference in its entirety.

BACKGROUND

With the rapid growth of the Internet, people are moving to viewing content online. A document such as a web page, native application, magazine, brochure, or online book is typically designed for display in a particular medium or viewport. However, the document is often accessed or provided to a variety of display (or target) devices such as tablet computers, mobile phones, PDAs, laptop computers, and the like. These target devices possess different characteristics, such as screen size or resolution, thereby establishing the need for different target display layouts for different target devices. Digital publishing often involves generating multiple copies of display layouts for use on different devices.

As such, designers typically use conventional systems to create multiple display layouts for multiple screen sizes and resolutions. Although conventional systems can create different display layouts for use on different devices, they suffer from a number of technical shortcomings in relation to efficiency, accuracy, and flexibility. Indeed, conventional systems require a significant amount of processing power, time, storage, and other computer resources. For example, conventional systems often require excessive designer interaction and time to create multiple display layouts. Conventional systems also often require designers to manually resize, move, remove, and/or create individual elements in the display layout.

Some conventional systems resize some elements based on manually-set rules. Even these conventional manual-rule resizing systems are inefficient. For example, most conventional manual-rule resizing systems require designers to individually define resize rules for each element in a display layout. Furthermore, creating multiple display layouts often requires developers to navigate through multiple user interfaces and invest excessive time and resources in order to determine and set the rules for resizing the display layouts.

Conventional systems also often produce inaccurately resized elements in resized display layouts. For example, many conventional systems simply resize the elements to the same scale of the new display layout. Such simple resizing often results in distorted final elements since many of the resized elements will have different aspect ratios than the original elements. As mentioned, many conventional resizing systems attempt to overcome this shortcoming by requiring designers to manually resize individual elements. However, because these conventional resize systems rely on human designers to manually adjust each element, the final display layout often includes misplaced and/or distorted elements, especially in display layouts containing multiple elements.

Furthermore, conventional systems are often inflexible. Indeed, conventional manual-rule resize systems are often limited to a small number of use cases. In particular, many conventional manual-rule resize systems require designers to define a new set of rules or update rules when the design is resized or otherwise updated. Additionally, conventional manual-rule resize systems are often limited to applying edge-pinning rules. For example, conventional manual-rule resize systems can often only pin the location of elements with reference to the nearest display layout edge. Thus, conventional manual-rule resize systems are often technologically limited from resizing elements when the elements are not located near a display layout edge. Additionally, conventional manual-rule resize systems are often inflexible because they cannot operate in cases where the element needs to be relocated, expanded, or diminished.

These along with additional problems and issues exist with regard to generating resized display layouts.

SUMMARY

Embodiments of the present invention comprise systems, methods, and computer-readable media that automatically resize designs using dynamically generated resize constraints based on a set of heuristics that take into consideration semantics of a design. As a result, when a user changes the size of a design, the systems, methods, and computer-readable media intelligently and automatically (e.g., without user input) resize design elements. In particular, the disclosed system analyze properties of the design and design elements. Furthermore, the systems dynamically generate constraints just before a resize operation so that any change in a design will automatically be adapted. The disclosed systems also dynamically apply new constraints as necessitated by the resized design and design elements. Furthermore, the systems are flexible and cover a large variety of cases.

To illustrate, in one or more embodiments, the disclosed systems can receive a request to resize a graphical user interface design layout from a first size to a second size. The graphical user interface design layout can include a plurality of graphical user interface elements. The disclosed systems analyze semantics of the graphical user interface design layout. Additionally, the disclosed systems automatically define a set of semantic-aware rules or constraints for the plurality of graphical user interface elements based on the analyzed semantics of the graphical user interface design layout. Furthermore, the disclosed systems generate a resized graphical user interface design layout of the second size by resizing the plurality of graphical user interface elements in accordance with the automatically defined set of semantic-aware resize constraints.

The following description sets forth additional features and advantages of one or more embodiments of the disclosed systems, computer media, and methods. In some cases, such features and advantages will be obvious to a skilled artisan from the description or may be learned by the practice of the disclosed embodiments.

BRIEF DESCRIPTION OF THE DRAWINGS

The detailed description provides one or more embodiments with additional specificity and detail through the use of the accompanying drawings, as briefly described below.

FIGS. 1A-1C illustrate a sequence of digital designs at a first size, during a resizing operation, and at a second size after having been resized subject to automatic semantic-aware resize constraints in accordance with one or more embodiments.

FIG. 2 illustrates a schematic of a first design element and a second design element with representative offsets in accordance with one or more embodiments.

FIGS. 3A-3F illustrate various pairs of design elements at a first size and at a second size after having been resized subject to automatic semantic-aware resize constraints in accordance with one or more embodiments.

FIGS. 7A-7D illustrate various pairs of design layouts including complex design elements at an initial size and a second size after having been resized subject to automatic semantic-aware resize constraints in accordance with one or more embodiments.

DETAILED DESCRIPTION

Figure 3B:
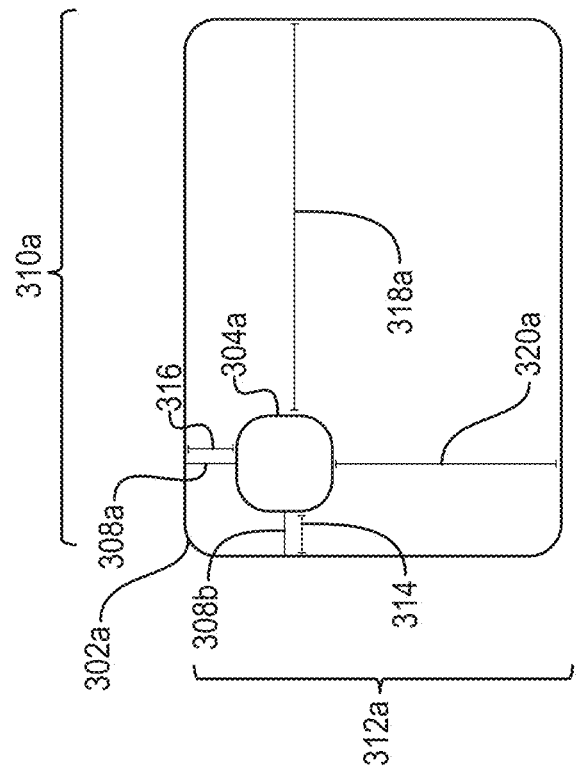

This disclosure describes one or more embodiments of a design resize constraint system that responsively resizes graphical user interface design layouts while keeping design semantics intact by dynamically generating and using semantic-aware resize constraints based on detected semantics of the graphical user interface design layouts. For example, the design resize constraint system can receive a request to resize a graphical user interface design layout. Based on receiving the request to resize the graphical user interface design layout, the design resize constraint system analyzes the semantics of the graphical user interface design layout including layout and hierarchy. Based on the analyzed design semantics, the design resize constraint system can dynamically generate semantic-aware resize constraints for the graphical user interface elements just before any resize operation. The design resize constraint system can resize the graphical user interface design layout, including graphical user interface elements within the graphical user interface design layout, using the semantic-aware resize constraints.

To illustrate, the design resize constraint system can generate a resized graphical user interface design layout with semantically resized graphical user interface elements. In particular, the design resize constraint system can receive a request to resize a graphical user interface design layout, which includes a plurality of graphical user interface elements, from a first size to a second size. The design resize constraint system can analyze semantics of the graphical user interface design layout. In particular, the design resize constraint system can identify the hierarchy of elements within a design (e.g., whether an element is a parent or child design element), the type of element (e.g., if the element is text or graphical), and the location of element edges in relation to each other among others. Based on the analyzed semantics, the design resize constraint system can define a set of semantic-aware resize constraints. The design resize constraint system uses the semantic-aware resize constraints to generate a resized graphical user interface design layout of the second size. As a result, when a designer requests to resize a graphical user interface design layout, the design resize constraint system intelligently and automatically (e.g., without user input) resizes all the graphical user interface elements in accordance with the dynamically generated semantic-aware resize constraints.

The design resize constraint system maintains spatial relationships for design elements at different sizes. In particular, in one or more embodiments, the design resize constraint system utilizes a heuristics system to define a set of semantic-aware resize constraints for a plurality of graphical user interface elements. In particular, the design resize constraint system can identify spatial relationships for graphical user interface elements of different sizes and locations. The design resize constraint system analyzes the semantics of the graphical user interface design layout using the heuristics systems to automatically define semantic-aware resize constraints for the graphical user interface elements. The design resize constraint system uses the analyzed semantics and heuristics system to determine semantically correct resizing behavior for graphical user interface elements and place corresponding semantic-aware resize constraints on the elements.

The design resize constraint system also provides a unique balance and workflow between auto-generated semantic aware constraints and manual constraints. In particular, the design resize constraint system makes any resize operation automatically constrained by auto-generated semantic aware constraints. Thus, the design resize constraint system does not need to present complex details about the constraints. If a designer chooses to edit the auto-generated semantic aware constraints and switches to manual constraints, the design resize constraint system reveals a constraints user interface pre-populated with constraints that allows a designer to make edits to change the responsive behavior of that element. The design resize constraint system can then use this feedback to optimize and run heuristic algorithm to intelligently learn.

As mentioned above, the design resize constraint system does not need to present complex details about the constraints or require a user to understand or give instructions regarding the constraints. That being said, the design resize constraint system can optionally show overlay lines representative of semantic-aware resize constraints applied to graphical user interface element. For example, the design resize constraint system can present overlay lines for showing pinning behavior of graphical user interface elements. The design resize constraint system can provide these overlays during the resize operation to provide a designer with an understanding of the semantic-aware resize constraints applied during resize without any visual noise during the design phase.

One or more embodiments described herein provide benefits and solve one or more of the foregoing or other problems in the art with a design resize constraint system that generates semantic-aware resize constraints based on a set of heuristics that take into consideration semantics of a design, layout, and hierarchy. For example, the design resize constraint system can improve efficiency in resizing graphical user interface design layouts. In particular, the design resize constraint system allows users go from systems where they have to create all of their resizing rules to one which the constraints are automatically generated and applied. Furthermore, in one or more embodiments, the design resize constraint system provides options to allow a user to modify or make tweaks to a design or constraints if a desired result is not achieved by the semantic-aware resize constraints. More particularly, the design resize constraint system improves efficiency in resizing design layouts by presenting the constraints user interface that allows designers to make edits and change constraints.

Additionally, the design resize constraint system improves accuracy relative to conventional systems. For example, the design resize constraint system maintains spatial relationships for graphical user interface elements at different sizes. In particular, the design resize constraint system uses a system of heuristics to identify semantically correct resizing behavior for graphical user interface elements and places semantic-aware resize constraints on graphical user interface elements based on design semantics. Thus, the design resize constraint system can generate resized designs that include correctly proportioned and located graphical user interface elements.

The design resize constraint system also improves flexibility relative to conventional systems. For example, the design resize constraint system covers and automatically adapts a large variety of cases. In particular, the design resize constraint system can analyze design semantics for any design. Based on the design semantics, the design resize constraint system uses a heuristics system that identifies appropriate semantic-aware resize constraints. Furthermore, the design resize constraint system can generate one or more semantic-aware resize constraints for each element in the design. In particular, the resize constraint system is not limited to applying edge-pinning rules. Rather, the resize constraint system can generate rules that dictate the shape of an element as well as the location of the element relative to other graphical user interface elements.

As illustrated by the foregoing discussion, the present disclosure utilizes a variety of terms to describe features and advantages of the design resize constraint system. Additional detail is now provided regarding the meaning of such terms. As used herein, the term "graphical user interface design layout" (or "design layout") refers to a visual design that includes an arrangement of visual elements. In particular, the term "graphical user interface design layout" refers to a user interface that includes graphical user interface elements. For example, a graphical user interface design layout can refer to a web page, a digital message, or a program interface.

As used herein, the term "graphical user interface elements" (or "design elements") refers to the visual elements of a graphical user interface design layout. In particular, the term "graphical user interface elements" refers to design units that are part of a graphical user interface design layout. For example, graphical user interface elements can include text, images, controls, overlays, boxes, interactive elements, and other graphical user interface components.

As used herein, the term "design semantics" (or simply "semantics") refers to characteristics or traits of a design. In particular, the term "design semantics" refers to characteristics of a graphical user interface design layout. For example, "design semantics" can refer to the design, layout, and hierarchy of graphical user interface elements in a design layout. Specifically, semantics can refer to hierarchical relationships between a parent design element and a child design element, the positional relationships between design elements, and any other relationships between design elements in a design layout. Additionally, semantics can refer to types of graphical user interface elements and the relative positioning of graphical user interface elements.

As used herein, the term "semantic-aware constraint" refers to a restriction applied to a design layout during resizing. In particular, "semantic-aware constraint" refers to rules applied to graphical user interface elements based on the semantics of the design layout. Semantic-aware constraint can refer to a rule that binds an edge of a graphical user interface element to an edge of the design layout or another graphical user interface element. For example, the design resize constraint system can generate a left, right, top, or bottom constraint for a design element. A left constraint fixes the distance of the left edge of a design element to the corresponding edge of a parent design element or the design layout. As a result, the left offset (i.e., distance between the left edge of the design element to the corresponding parent edge) remains fixed through the resizing operation. Additionally, the term "semantic-aware constraint" can refer to rules that fix the sizes of design elements. For example, the design resize constraint system can set a height or width constraint on a design element that fixes the height or width of the design element.

As discussed above, the design resize constraint system can intelligently resize design elements in accordance with semantic-aware resize constraints. FIGS. 1A-1C illustrate an example resized graphical user interface design. Though FIGS. 1A-1C illustrate resizing a design element, more particularly a parent design element that includes multiple child design elements, the design resize constraint system can resize entire graphical user interface design layouts that include multiple design elements.

FIG. 1A illustrates a graphical user interface design layout 102 ("design layout 102") of a first size 112. In particular, the design element 102 of the first size 112 includes a title design element 104, a text design element 106, and interactive design elements 108a and 108b. As illustrated, the design resize constraint system can receive, as input, the graphical user interface design layout 102 of the first size 112. The design resize constraint system can allow for resizing of the design layout 102 and then automatically resize the included design elements using auto-generated semantic-aware resize constraints.

The design resize constraint system analyzes semantics of the graphical user interface design layout 102 and defines a set of semantic-aware resize constraints for the design layout 102. As illustrated in FIG. 1B, the design resize constraint system presents pinning overlays 110a-d in the design layout 102 that represent the set of semantic-aware resize constraints. In particular, FIG. 1B illustrates the design layout 102 of an intermediate size 114 in the process of being resized. The design layout 102 of the intermediate size 114 includes top pinning overlays 110a, right pinning overlays, 110b, left pinning overlays 110c, and bottom pinning overlays 110d (collectively "pinning overlays 110a-d").

As discussed above, the design resize constraint system can receive a request to resize the design layout 102. For example, a designer can manually select and drag an edge of the design layout 102 to resize the design layout 102. Alternatively, the designer can specify the dimensions of the desired resized design layout 102. Additionally, the designer can request to resize the parent design element by submitting a request to resize the entire graphical user interface design layout 102. Based on the request to resize the design layout 102, the design resize constraint system analyzes the design semantics of the design layout 102 of the first size 112. In particular, the design resize constraint system analyzes properties of the design elements of the design layout 102 of the first size 112 both individually and with respect to each other.

Using the detected semantics of the design layout 102, the design resize constraint system defines a set of semantic-aware resize constraints for each of the design elements in the design layout 102. For example, the design resize constraint system defines semantic-aware resize constraints for each of the title design element 104, the text design element 106, and the interactive design elements 108a and 108b.

The design resize constraint system generates pinning overlays 110a-d to represent the semantic-aware resize constraints. In particular, pinning overlays 110a-d show pinning behavior of child design elements. The pinning overlays 110a-d give designers an understanding of the resize operation without excessive visual noise during the design phase. For example, top pinning overlays 110a represent applied top constraints (i.e., the top edge of the child design element is pinned to the edge of the design layout 102). As illustrated by the top pinning overlay 110a and the left pinning overlay 110c applied to the title design element 104 in FIG. 1B, the design resize constraint system applied top and left constraints to the title design element 104. As illustrated, the design resize constraint system provides a left pinning overlay 110c and a right pinning overlay 110b to the text design element 106. Additionally, the design resize constraint system provides a left pinning overlay 110c and a bottom pinning overlay 110d for the interactive design element 108a. The design resize constraint system provides a right pinning overlay 110b and a bottom pinning overlay 110b for the interactive design element 108b.

After the resize operation, the design resize constraint system generates a resized design layout. As illustrated in FIG. 1C, the design resize constraint system generates the design layout 102 of a second size 116. In particular, the design resize constraint system resizes the child design elements in the design layout 102 in accordance with the set of semantic-aware resize constraints. For example, while expanding the design layout 102, the design resize constraint system also appropriately binds the edges of the child design elements the edges of the design layout 102. As illustrated, the design resize constraint system applies a top constraint and a left constraint to the title design element 104. Accordingly, the design resize constraint system resizes the design layout by constraining the title design element 104 of the design layout 102 of the second size 116 to be the same distance from the top and left edges of the design layout 102 of the first size 112. Similarly, the design resize constraint system constraints the text design element 106 in the design layout 102 of the second size 116 to be the same distance from the left and right edges of the design layout 102 of the first size 112. Furthermore, the design resize constraint system constraints the interactive design elements 108a of the design layout 102 of the second size 116 to be the same distance from the left and bottom edges of the design layout 102 of the first size 112. Finally, the design resize constraint system constraints the interactive design elements 108b of the design layout 102 of the second size 116 to be the same distance from the right and bottom edges of the design layout 102 of the first size 112.

FIGS. 1A-1C provide a brief overview of an example of resizing a design layout using automatically (without user input) and dynamically (on the fly in response to a resize request) semantic-aware resize constraints. Addition details on the process of analyzing the semantics of a design layout and generating the semantic-aware resize constraints will be provided below.

As part of analyzing the semantics of a design layout, the design resize constraint system can measure offset values between design elements and/or the design elements and the boundaries of the design layout to generate semantic-aware resize constraints. FIG. 2 illustrates offsets between a first design element and a second design element. FIG. 2 illustrates a schematic diagram of a first design element 202 and a second design element 204. The second design element 204 is nested within the first design element 202. In one or more embodiments, the first design element 202 is a parent design element and the second design element 204 is a child design element. In one or more embodiments, the design resize constraint system can base one or more of the auto-generated semantic-aware constraints based on offsets of the child design element relative to the parent design element. As used herein, the term "offset" refers to a distance between an edge of a design element and an edge of another design element. In particular, an offset refers to the distance between an edge of a design element and the corresponding edge of another design element or the design layout. For example, a left offset can be a distance between a left edge of a child design element and the left edge of a parent design element.

For example, FIG. 2 illustrates shows a left offset 206 that defines a distance of a left side of the second design element 204 to the left side of the first design element 202. Similarly, FIG. 2 shows an upper offset 208 that defines a distance of an upper side of the second design element 204 to an upper side of the first design element 202. FIG. 2 shows a right offset 210 that defines a distance of a right side of the second design element 204 to the right side of the first design element 202. Finally, FIG. 2 shows a bottom offset 212 that defines a distance of a bottom side of the second design element 204 to the bottom side of the first design element 202.

As mentioned above, the design resize constraint system can use semantic-aware resize constraints to automatically size and move design elements within a design layout. FIGS. 3A-3F illustrate various pairs of design elements at an initial size and an updated size after having been resized subject to automatic semantic-aware resize constraints in accordance with one or more implementations. In particular, FIGS. 3A-3F illustrate pairs of a first design element 302 and a second design element 304 in which the second design element 304 is nested within the first design element 302. More specifically, the pairs illustrated in FIGS. 3A-3F show a first pair of a first design element 302 of an initial size and the second design element 304 of an initial size and a second pair of a resized first design element 302a and a resized second design element 304a. In at least one embodiment, the first design element 302 represents a parent design element and the second design element 304 represents a child design element. In at least one other embodiment, the first design element 302 represents a design layout including the second design element 304.

Figure 3A:
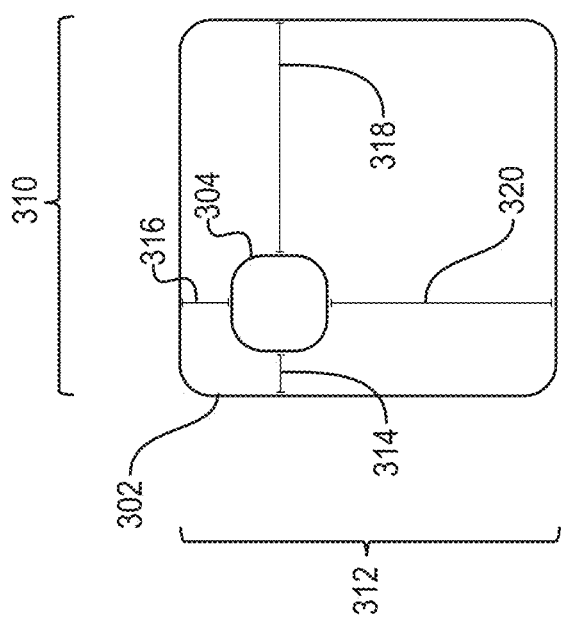

As discussed above, the design resize constraint system measures offsets of design elements of an initial size. FIG. 3A illustrates the first design element 302 and the second design element 304 at an initial size. The design resize constraint system measures a left offset 314, a top offset 316, a right offset 318, and a bottom offset 320 of the first design element 302 of the initial size. Additionally, the design resize constraint system measures a width 310 and a height 312 of the first design element 302 of the initial size.

The design resize constraint system can apply semantic-aware resize constraints based on the offset lengths relative to the design element. For example, based on determining that an offset of a child design element is less than a threshold proportion of the size of a parent design element, the design resize constraint system can apply corresponding semantic-aware resize constraints. As illustrated in FIG. 3A, the design resize constraint system determines that the left offset 314 is less than a threshold proportion of the width 310 of the first design element 302. Based on this determination, the design resize constraint system applies a left constraint. Likewise, based on determining that the top offset 316 is less than a threshold proportion of the height 312, the design resize constraint system applies a top constraint.

The design resize constraint system resizes the second design element 304 based on the applied semantic-aware resize constraints. For example, FIG. 3B illustrates pinning overlays that represent the applied semantic-aware resize constraints during a resizing operation. In particular, FIG. 3B illustrates a top pinning overlay 308a and a left pinning overlay 308b. Additionally, FIG. 3B includes a resized first design element 302a, a resized second design element 304a, a maintained top offset 316, a maintained left offset 314, an updated bottom offset 320a and an updated right offset 318a.

FIG. 3B illustrates the design elements during a resizing operation. As used herein, the term "resizing operation" refers to the intermediate period between the time when a design layout is a first size and when the design layout is a second size. The design resize constraint system presents pinning overlays for design elements during a resizing operation. FIG. 3B illustrates the design resize constraint system automatically resizing the second design element 304 based on the resized first design element 302. In particular, the design resize constraint system applied a top constraint and a left constraint as shown by a top pinning overlay 308a and a left pinning overlay 308b. Based on the top constraint, the design resize constraint system pinned the top edge of the second design element 304 to the top edge of the first design element 302. In particular, as the design resize constraint system resizes the updated first design element 302a, the updated top offset 316 will remain constant. Similarly, based on the left constraint, the design resize constraint system pins the left edge of the second design element 304 to the left edge of the first design element 302. Thus, as illustrated, as the design resize constraint system expands the size of the first design element 302, the updated left offset 314 remains constant.

Offsets for design elements edges that are not pinned expand and diminish during resizing operations. For example, as illustrated by FIG. 3B, the design resize constraint system does not apply constraints to the bottom or right edges of the second design element 304. As illustrated, the updated right offset 318a and the bottom offset 320a do not stay constant. Rather, as the design resize constraint system expands the first design element 302 to generate the resized first design element 302a, the design resize constraint system lengthened the right offset 318 to the updated right offset 318a and lengthened the bottom offset 320 to the updated bottom offset 320a.

FIGS. 3A-3B illustrate one example of resizing behaviors of the second design element 304 based on applied top and left constraints. FIGS. 3C-3F illustrate additional examples of resizing behaviors of the second design element 304 based on additional combinations of semantic-aware resize constraints.

The design resize constraint system can dynamically analyze design semantics for a design layout just before a resizing operation. In particular, the design resize constraint system does not require designers to apply or update constraints as the design layout changes. Instead the design resize constraint system automatically adapts any change in the design and applies new rules as necessary. For example, a designer can change the design semantics of the first design element 302 of FIG. 3A by elongating the second design element 304 to generate the elongated second design element 304b of FIG. 3C. The design resize constraint system analyzes the semantics of the first design element 302 and the second design element 304b based on the change to generate the appropriate semantic-aware resize constraints for the elongated second design element 304b. Thus, any resizing adjustments made to the first design element 302 of FIG. 3C including the elongated second design element 304b are made using constraints applied using the dynamically-analyzed design semantics.

Figures 3C, 3D:
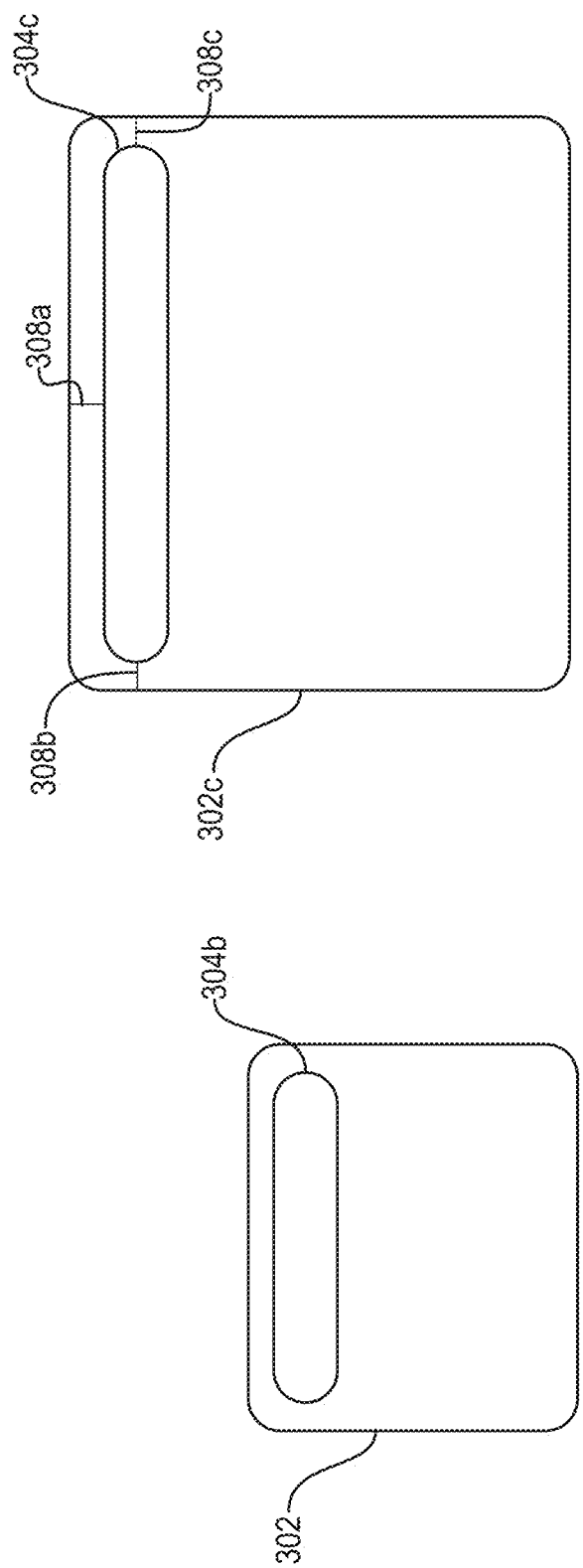

FIG. 3C illustrates the first design element 302 and the second design element 304b at an initial size. As illustrated in FIG. 3C, the right edge of the second design element 304b is located in close proximity to the right edge of the first design element 302. The design resize constraint system determines that the left, top, and right offsets are less than a proportional threshold of the size of the first design element 302. Based on this consideration, the design resize constraint system applies a left constraint, a top constraint, and a right constraint to the second design element 304b.

FIG. 3D illustrates the first design element 302 and the second design element 304b of FIG. 3C during a resizing operation. In particular, the design resize constraint system presents a top pinning overlay 308a, a left pinning overlay 308b, and a right pinning overlay 308c to correspond to the applied top, left, and right constraints. Thus, as the design resize constraint system generates a resized first design element 302c, the top, left, and right offsets remain constant while the bottom offset changes based on the resized first design element 302c. Thus, the design resize constraint system generates a resized first design element 304c that is further elongated to maintain the top, left, and right offsets. Thus, a comparison of FIGS. 3A-3B with 3C-3D illustrate how the design resize constraint system varies semantic-aware resize constraints based on the semantics of a design layout.

FIGS. 3E and 3F illustrate that a designer has changed the design semantics of the first design element 302 of FIG. 3A by enlarging the second design element 304 to generate an enlarged second design element 304d of FIG. 3E. The design resize constraint system analyzes the semantics of the first design element 302 and the second design element 304d based on the change to generate the appropriate semantic-aware resize constraints for the elongated second design element 304d. In particular, the design resize constraint system applies top, left, right, and bottom semantic-aware resize constraints to the second design element 304d. In particular, FIG. 3E illustrates the first design element 302 and the second design element 304d at the initial size. As illustrated, the design constraint system determines that all of the offsets (i.e., top, left, right, and bottom) of the second design element 304d are less than the threshold proportion of the first design element 302. For example, the design constraint system determines that each of the top and bottom offsets are less than the threshold proportion of the height of the first design element 302. Additionally, the design constraint system determines that each of the left and right offsets are less than the threshold proportion of the width of the first design element 302. The design constraint system thus determines to apply top, left, right, and bottom constraints to the second design element 304d.

FIG. 3F illustrates a resized first design element 302d and a resized second design element 304e during or after a resizing operation. As illustrated in FIG. 3F, the design resize constraint system represents each of the applied semantic-aware resize constraints using pinning overlays. In particular, the design constraint system displays the top pinning overlay 308a, the left pinning overlay 308b, the right pinning overlay 308c, and the bottom pinning overlay 308d. As illustrated, because the design resize constraint system applied all offsets to the second design element 304, all of the offset values of the second design element 304 remain fixed/constant through the resizing operation. More particularly, because all of the edges of the second design element 304d are pinned to the corresponding edges of the first design element 302, the second design element 304d expands with the first design element 302.

Figure 4A:
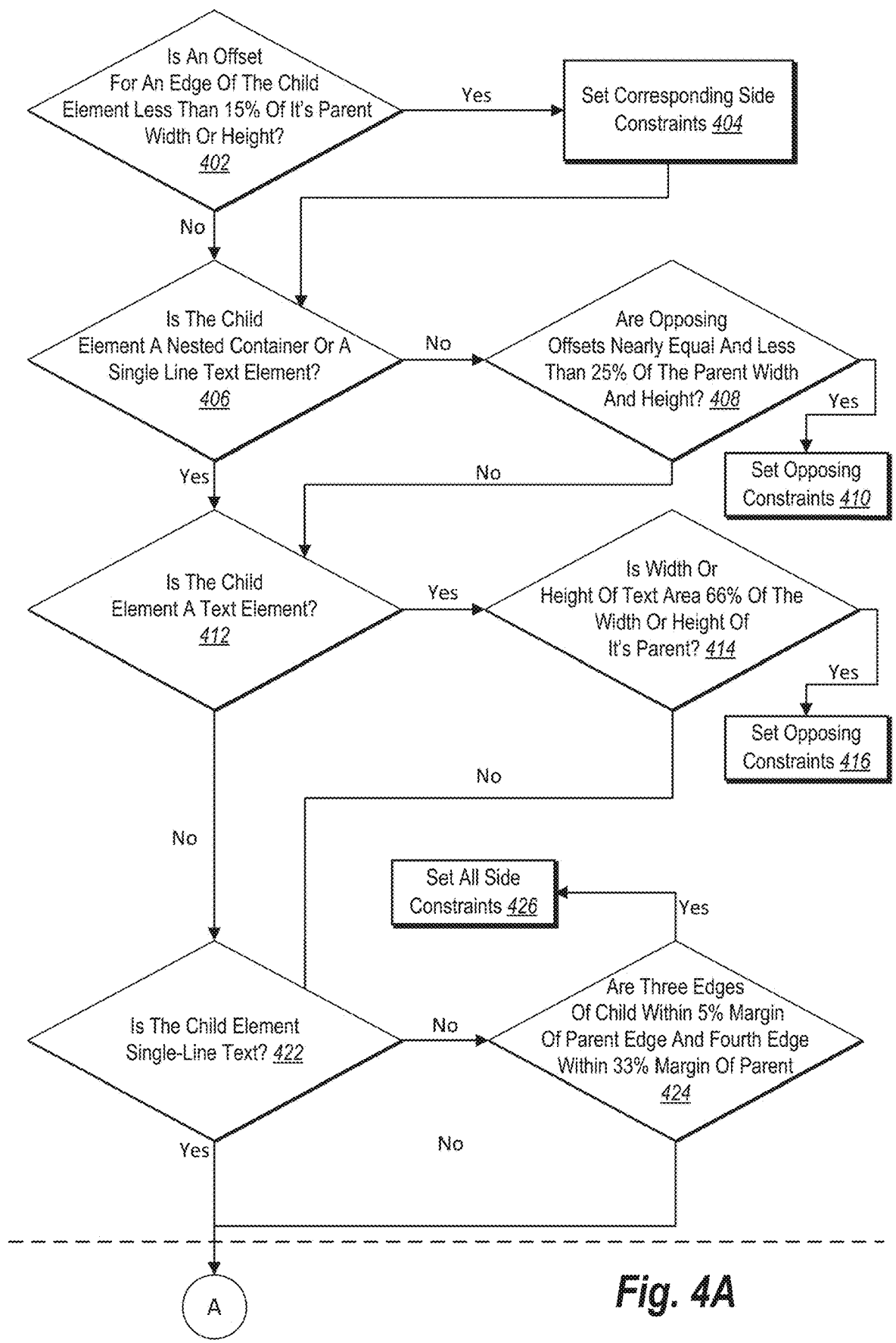
FIGS. 4A-4B illustrate a state diagram representing heuristics for generating appropriate semantic-aware resize constraints in accordance with one or more embodiments.
Figure 4B:
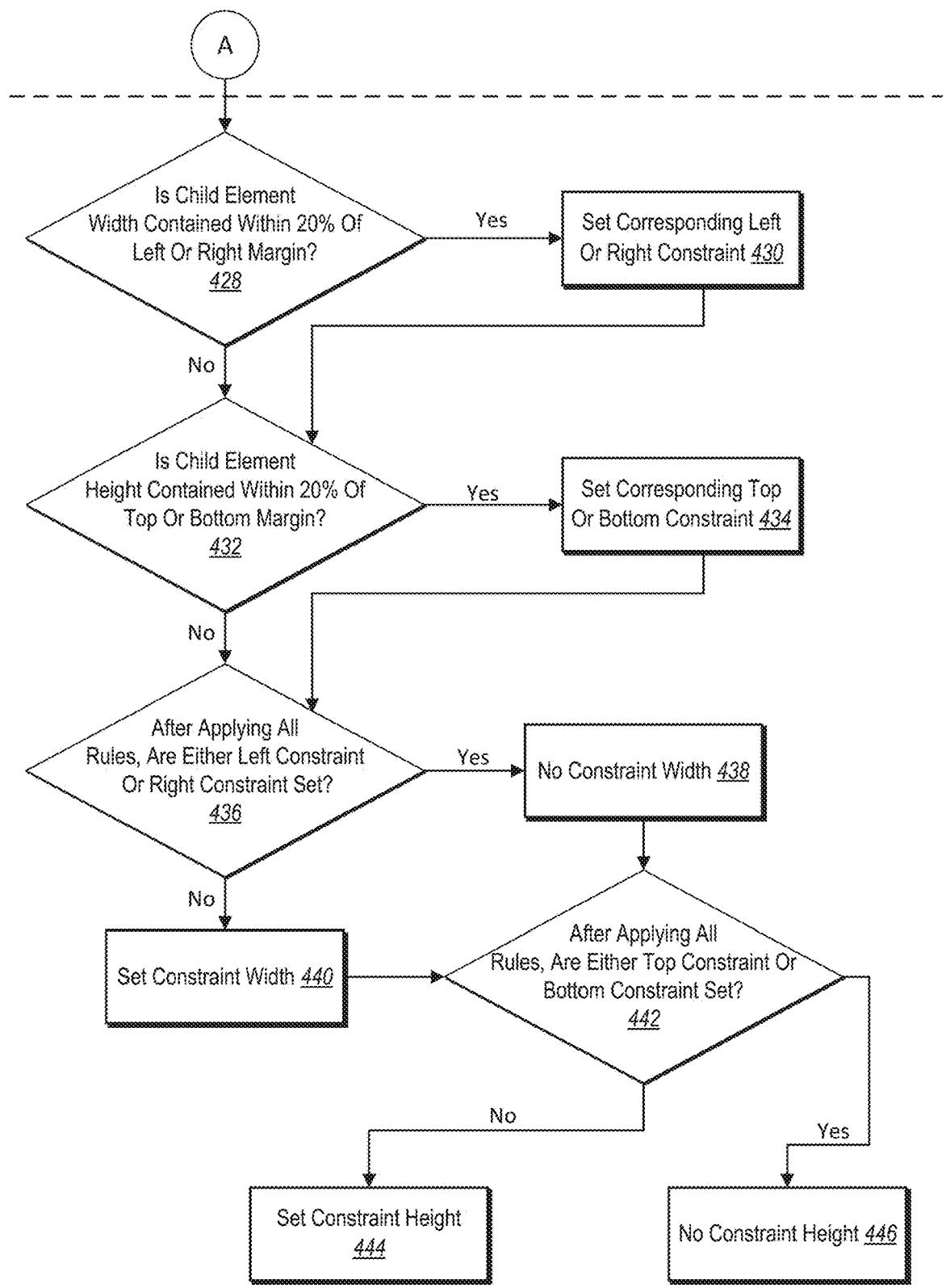

As discussed and shown above, the design resize constraint system can apply semantic-aware resize constraints based on analyzed semantics of a graphical user interface design layout. FIGS. 4A-4B illustrate a state diagram demonstrating how the design resize system applies a set of heuristics to design elements to generate semantic-aware resize constraints. In particular, as discussed above, the design resize constraint system analyzes characteristics of design elements (e.g., size, position, type, etc.), and relative positions of the design elements (e.g., hierarchy, offsets, nesting, etc.). The design resize constraint system utilizes a heuristics system comprising a set of heuristics to the analyzed characteristics to generate semantic-aware resize constraints.

In at least one embodiment, the design resize constraint system applies the following constraint rules (i.e., heuristics) to each design element in a design layout in the following order:

1. If the left offset of a child design element is less than 15% of its parent width, then set a left constraint for the child design element.
2. If the right offset of a child design element is less than 15% of its parent width, then set a right constraint for the child design element.
3. If the top offset of a child design element is less than 15% of its parent width, then set a top constraint for the child design element.
4. If the bottom offset of a child design element is less than 15% of its parent width, then set a bottom constraint for the child design element.

Rules 5 to 6 apply to child design elements that are not nested containers and not a single line text element.

5. If the left offset and the right offset are nearly equal (only differ by 1) and they are less than 25% of the parent width, then set a left constraint and a right constraint for the child design element. This will make the child design element width resize with the parent design element width.
6. If the top offset and the bottom offset are nearly equal (only differ by 1) and they are less than 25% of the parent height, then set a left constraint and a right constraint for the child design element. This will make the child design element height resize with the parent design element height.

Rules 7 to 8 apply to text area child design elements.

7. If the width of the text area child design element is 66% of the width of its parent, then set a left constraint and a right constraint for the child design element. This will make the child design element width resize with the parent design element width.
8. If the height of the text area child design element is 66% of the height of its parent, then set a top constraint and a bottom constraint for the child design element. This will make the child design element height resize with the parent design element height.

Rule 9 applies to all times of child design elements except single line text.

9. If three edges of the child design element are within a 5% margin of the parent edge and the fourth edge is within a 33% margin of the parent, then set top, bottom, left, and right constraints for the child design element. This will make the child design element width and height resize with the parent design element width and height.

Rules 10 to 13 apply to all types of child design elements.

10. If the child design element width bounds are contained within 20% of the left margin, then set a left constraint.
11. If the child design element height bounds are contained within 20% of the top margin, then set a top constraint.
12. If the child design element width bounds are contained within 20% of the right margin, then set a right constraint.
13. If the child design element height bounds are contained within 20% of the bottom margin, then set a bottom constraint.

Rules 14 to 15 are catch all rules.

14. If after applying all the above rules, neither left nor right constraints are set, then set a width constraint.
15. If after applying all the above rules, neither top nor bottom constraints are set, then set a height constraint.

Each of these constraint rules will be discussed in additional detail below in the description accompanying FIGS. 4A and 4B. Although FIGS. 4A and 4B describe the process of analyzing semantics of a child design element with relation to a parent design element, the design resize system can analyze the semantics of any design element with respect to either a parent design element or the design layout.

As illustrated in FIG. 4A and as mentioned above, the design resize constraint system begins by determining whether an offset of the child design element less than 15% of its parent width or height. As part of step 402, the design resize constraint calculates 15% of the parent height and calculates 15% of the parent width. The design resize constraint system accesses the offset values (e.g., top, left, right, and bottom) for the child design element and determines whether the offset is less than 15% of the corresponding parent height or width.

As illustrated in FIG. 4A, based on determining that an offset is less than 15% of the corresponding parent height or width, the design resize constraint system performs a step 404 of setting a corresponding side constraint. For example, based on determining that the left offset is less than 15% of the parent height, the design resize constraint system sets a left constraint. The design resize constraint system repeats this analysis for each of the right, top, and bottom offsets of the child design element.

The design resize constraint system next considers the hierarchy of design elements within the design layout. In particular, as part of step 406 of FIG. 4A, the design resize constraint system determines whether the child design element is a nested container or a single line text element. In particular, the design resize constraint system determines whether the design element is nested within another larger design element. Additionally, the design resize constraint system determines whether the design element comprises a single line of text.

If the design resize constraint system determines that the child design element is not a nested container or a single line text element, the design resize constraint system performs step 408 of determining whether opposing offsets are nearly equal and less than 25% of the parent width and height. For example, the design resize constraint system measures the left and right offsets of the design element to the corresponding edges of the parent design element or the design layout. The design resize constraint system also measures the width of the parent design element or the design layout. If the left and right offsets are nearly equal and less than 25% of the parent width, the design resize constraint system proceeds to step 410 and sets left and right constraints. Similarly, the design resize constraint system measures the top and bottom offsets of the design element to the corresponding edges of the parent design element or design layout. The design resize constraint system measures the height of the parent design element or design layout. If the top and bottom offsets are nearly equal and less than 25% of the parent height, the design resize constraint system proceeds to step 410 and sets top and bottom constraints.

The design resize constraint system proceeds to step 412 to determine whether the child design element is a text element. If the design resize constraint system determines that the child design element is a text element, the design resize constraint system proceeds to step 414 of determining whether the width or height of the text area is 66% of the width or height of its parent. More specifically, the design resize constraint system determines whether the width of the text area is 66% or more of its parent width. Based on determining that the width of the child design element is 66% or more of its parent width, the design constraint system proceeds to step 416 and sets left and right constraints on the child design element. Similarly, based on determining that the height of the child design element is 66% or more of the parent height, the design resize constraint system sets top and bottom constraints as part of step 416.

For non-text elements, the design resize constraint system further evaluates whether the child design element is single line text 422. For child design elements that are not single line text, the design resize constraint system proceeds to step 424 to determine whether three edges of the child design element are within a 5% margin of the parent edge and a fourth edge is within a 33% margin of the parent. In particular, the design resize constraint system identifies a 5% margin of the right and left parent edges by calculating 5% of the width of the parent design element. The design resize constraint system identifies a 5% margin of the top and bottom parent edges by calculating 5% of the height of the parent design element. The design resize constraint system performs a similar analysis to identify whether the fourth edge is within a 33% margin of the parent design element. Based on determining that three edges of the child design element are within a 5% margin of the parent edge and the fourth edge is within a 33% margin, the design resize constraint system proceeds to step 426 and sets top, left, right, and bottom constraints on the child design element.

Next, the design resize constraint system evaluates whether the child design element width is contained within 20% of the left or right margin of the parent design element 428. Based on determining that the entire width of the child design element is contained within 20% of the left margin, the design resize constraint system sets a left constraint in step 430. Similarly, based on determining that the entire width of the child design element is contained within 20% of the right margin, the design resize constraint system sets a right constraint in step 430.

As part of step 432, the design resize constraint system evaluates whether the child design element height is contained within 20% of the top or bottom margin of the parent design element. Based on determining that the entire height of the child design element is contained within 20% of the top margin, the design resize constraint system sets a top constraint in step 434. Similarly, if the design resize constraint system determines that the entire height of the child design element is contained within 20% of the bottom margin, the design resize constraint system sets a bottom constraint in step 434.

After the design resize constraint system has applied all of the discussed heuristics, the design resize constraint system evaluates the design element using catch all heuristics. In particular, the design resize constraint system determines whether either the left constraint or right constraint are set in step 436. If the design resize constraint system determines that neither the left constraint nor right constraint are set, then the design resize constraint system sets a width constraint in step 440. On the other hand, based on determining that either a right constraint or left constraint are set, the design resize constraint system does not set a width constraint in step 438.

Additionally, the design resize constraint system determines whether either the top constraint or the bottom constraint are set in step 442. In particular, based on determining that either a top constraint or a bottom constraint have been applied to the design element, the design resize constraint system does not set a height constraint in accordance with step 446. Alternatively, if the design resize constraint system determines that neither a top nor bottom constraint have been set, the design resize constraint system sets a height constraint in step 444.

Figure 5A:
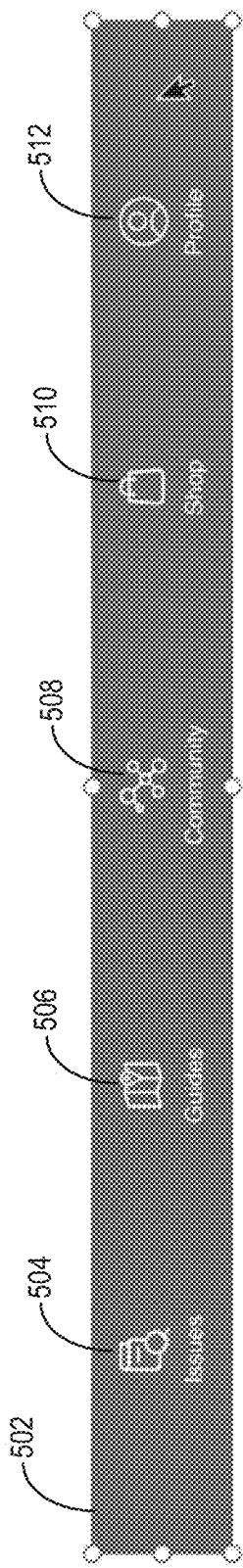
FIGS. 5A-5B illustrate a pair of a design layout at an initial size and at a second size after having been resized subject to automatic semantic-aware resize constraints in accordance with one or more embodiments.
Figure 5B:
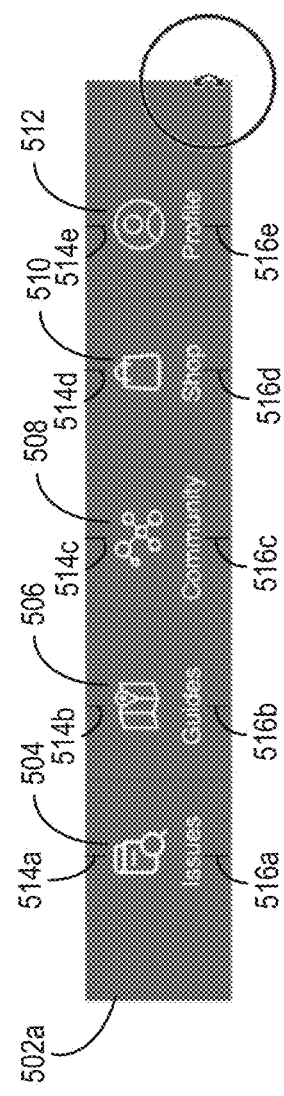

FIGS. 5A and 5B illustrate an example application of the heuristics described above with respect to FIGS. 4A and 4B. FIGS. 5A and 5B illustrate an example parent design element and child design elements. In particular, FIG. 5A illustrates a parent design element 502 with child design elements 504, 506, 508, 510, and 512. FIG. 5B illustrates an updated parent design element 502*a* during a resizing operation.

The design resize constraint system accesses semantic information regarding the parent design element 502 and the child design elements 504, 506, 508, 510, and 512. The design resize constraint system then uses the heuristics system to identify applicable semantic-aware resize constraints for the parent design element 502. In particular, the design resize constraint system applies the above-mentioned heuristics. For example, the design resize constraint system first applies rules 1-4 to the child design elements 504, 506, 508, 510, and 512. Focusing specifically on child design element 504, the design resize constraint system determines that the top offset of the child design elements 504 is less than 15% of the parent design element 502 height. Thus, the design resize constraint system sets a top constraint on the child design element 504, which binds the top edge of the child design element 504 to the top edge of the parent design element 502. The design resize constraint system also determines that the bottom offset of the child design element 504 is less than 15% of the parent design element 502 height.

Thus, the design resize constraint system also sets a bottom constraint on the child design element 504. The design resize constraint system determines that neither the right nor left offsets of the child design element are less than 15% of the width of the parent design element 502. Thus, the design resize constraint system does not set left or right constraints at this point.

The design resize constraint system does not apply rules 5-6 because the child design elements 504, 506, 508, 510, and 512 are nested containers. Additionally, the design resize constraint system does not apply rules 7-8 because the child design elements 504, 506, 508, 510, and 512 are not text area child design elements. The design resize constraint system applies rule 9 to the child design elements 504, 506, 508, 510, and 512. However, because 3 edges of none of the child design elements are within a 5% margin of the parent edge, the design resize constraint system does not apply additional constraints. Finally, based on rules 14 and 15, the design resize constraint system sets width constraints on all of the child design elements 504, 506, 508, 510, and 512 because the design resize constraint system has set neither left nor right constraints on the child design elements. Thus, based on the applied heuristics system, the design resize constraint system applies top semantic-aware constraints, bottom semantic-aware resize constraints, and width semantic-aware resize constraints to each of the child design elements 504, 506, 508, 510, and 512.

FIG. 5B illustrates a resized parent design element 502*a* during a resizing operation. As illustrated in FIG. 5B, the resized parent design element 502*a* is shorter in width than the initial parent design element 502. In particular, the parent design element 502*a* includes top pinning overlays 514 and bottom pinning overlays 516 that correspond with the top semantic-aware constraints and bottom semantic-aware resize constraints. In at least one embodiment, the design resize constraint system introduces width pinning overlays to represent the width constraints applied to the child design elements 504, 506, 508, 510, and 512.

Figure 6A:
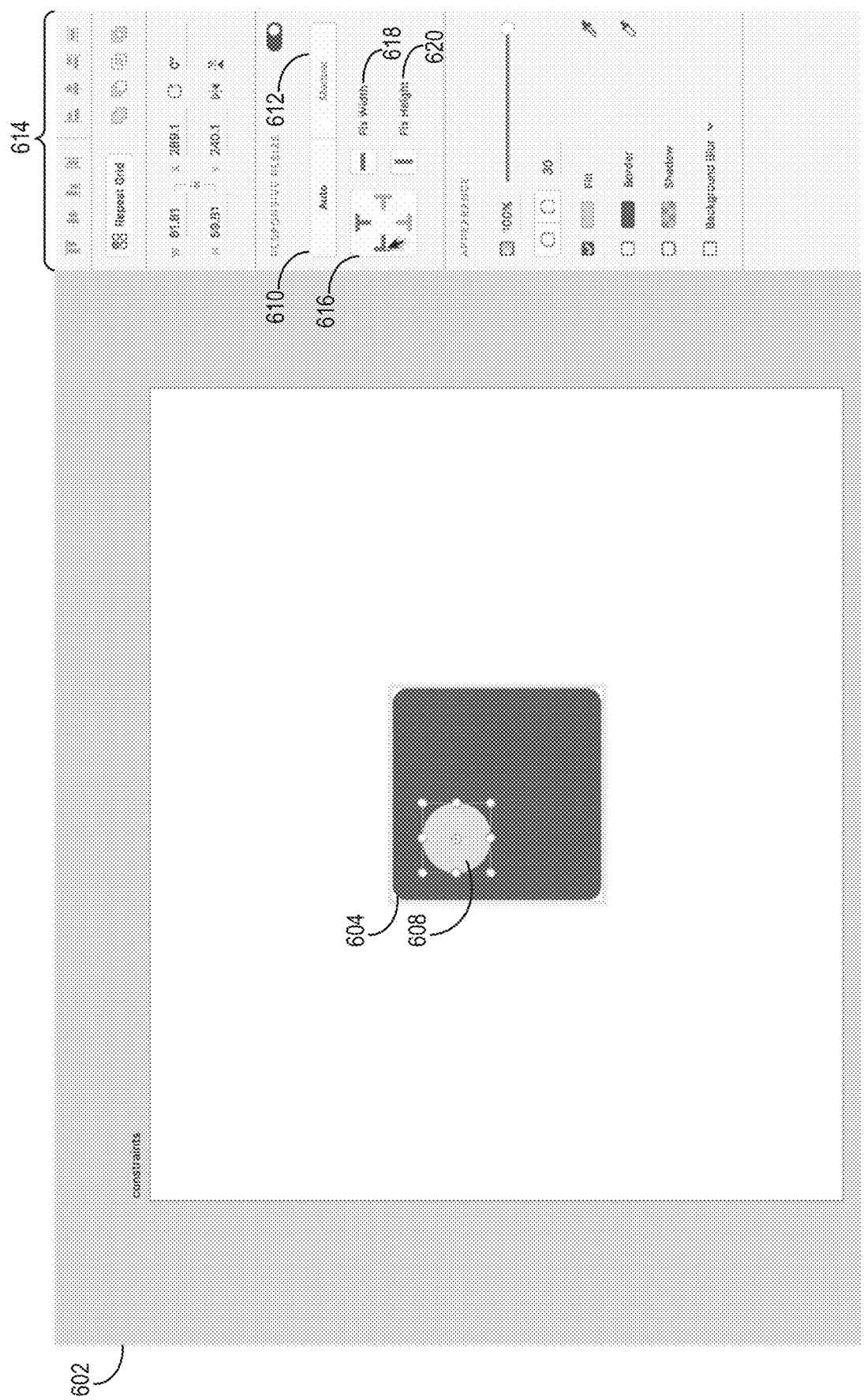
FIGS. 6A-6D illustrate various pairs of graphical user interfaces showing automatic semantic-aware resize constraints and manually-selected constraints in accordance with one or more embodiments.
Figure 6B:
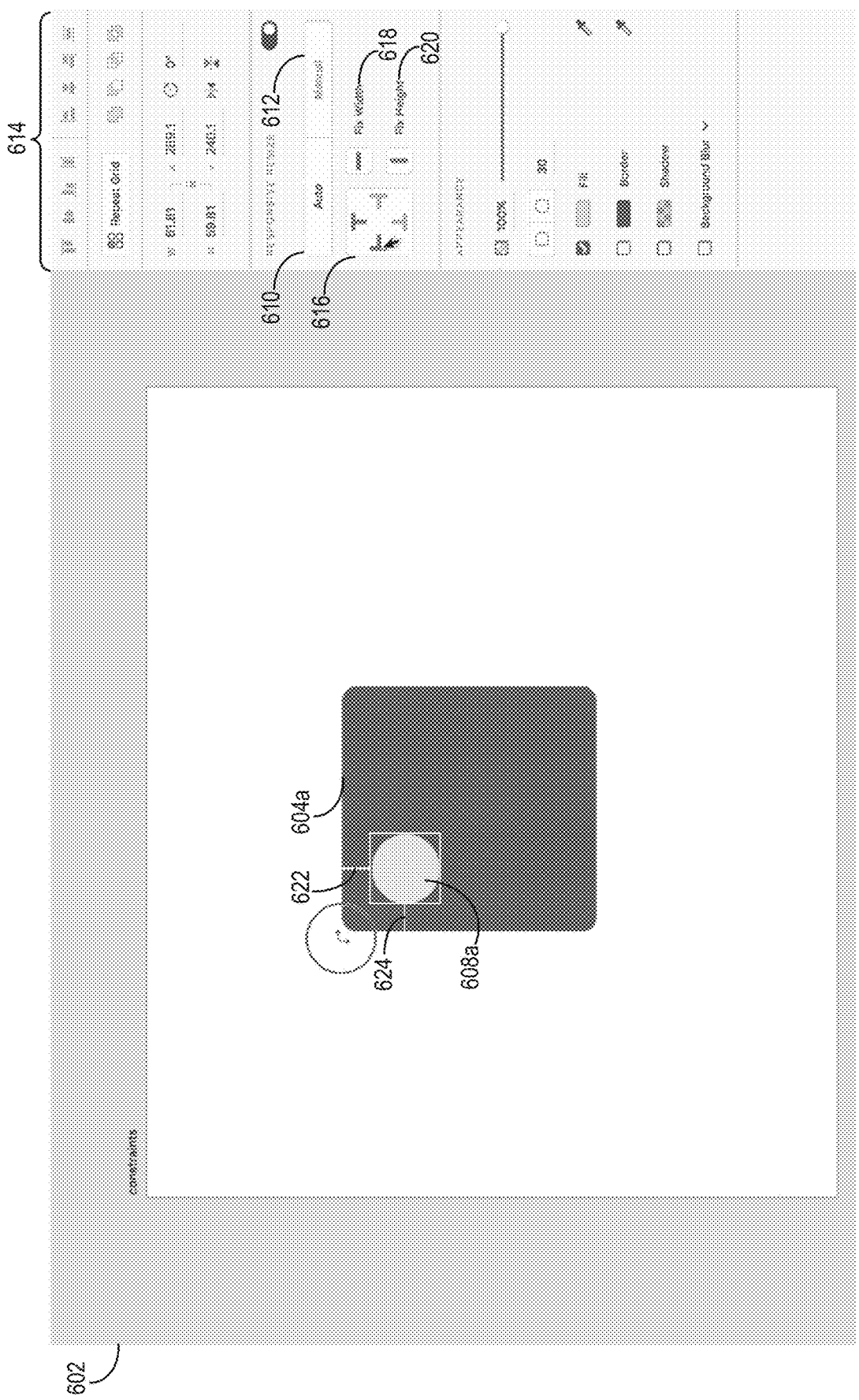
Figure 6C:
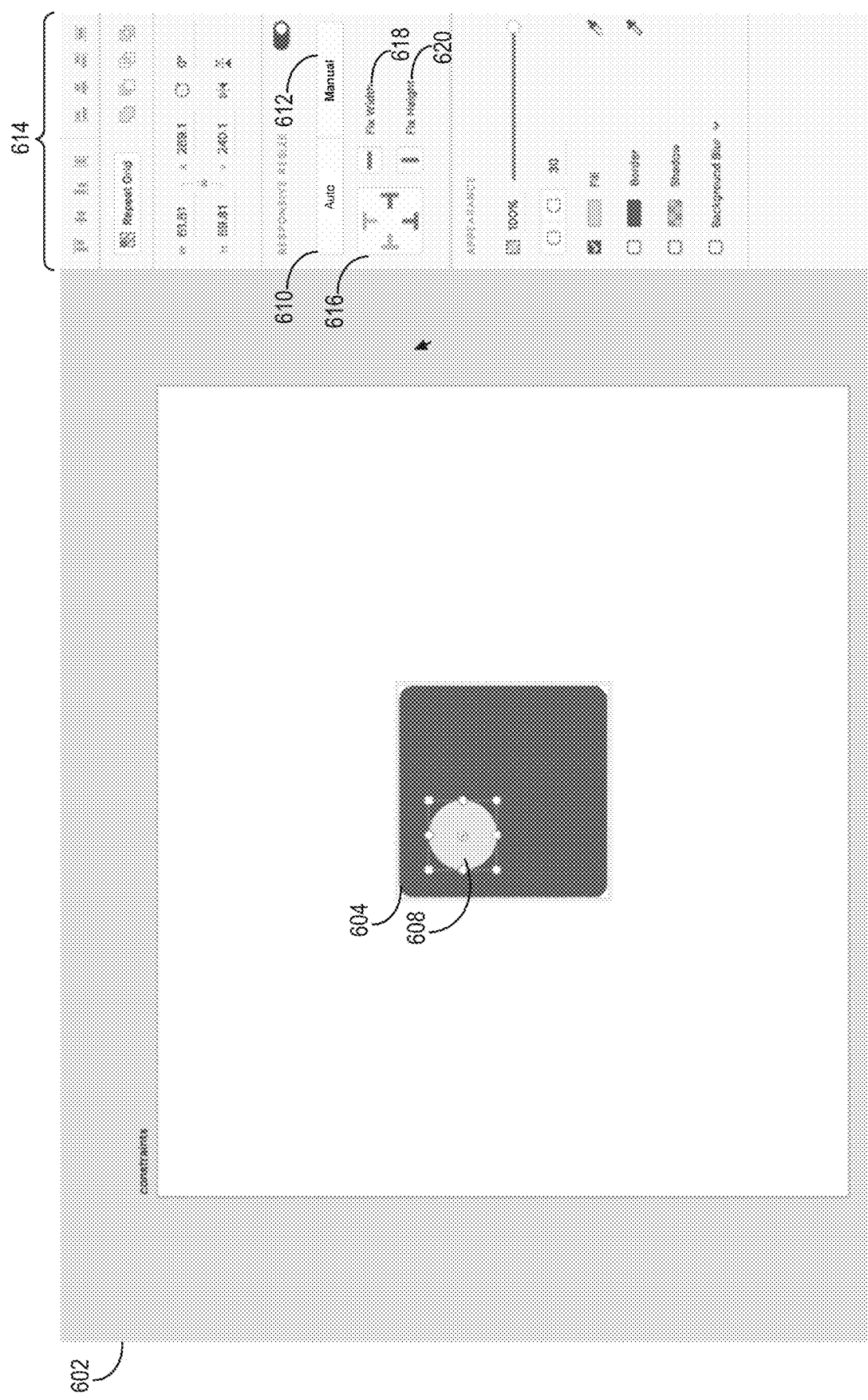
Figure 6D:
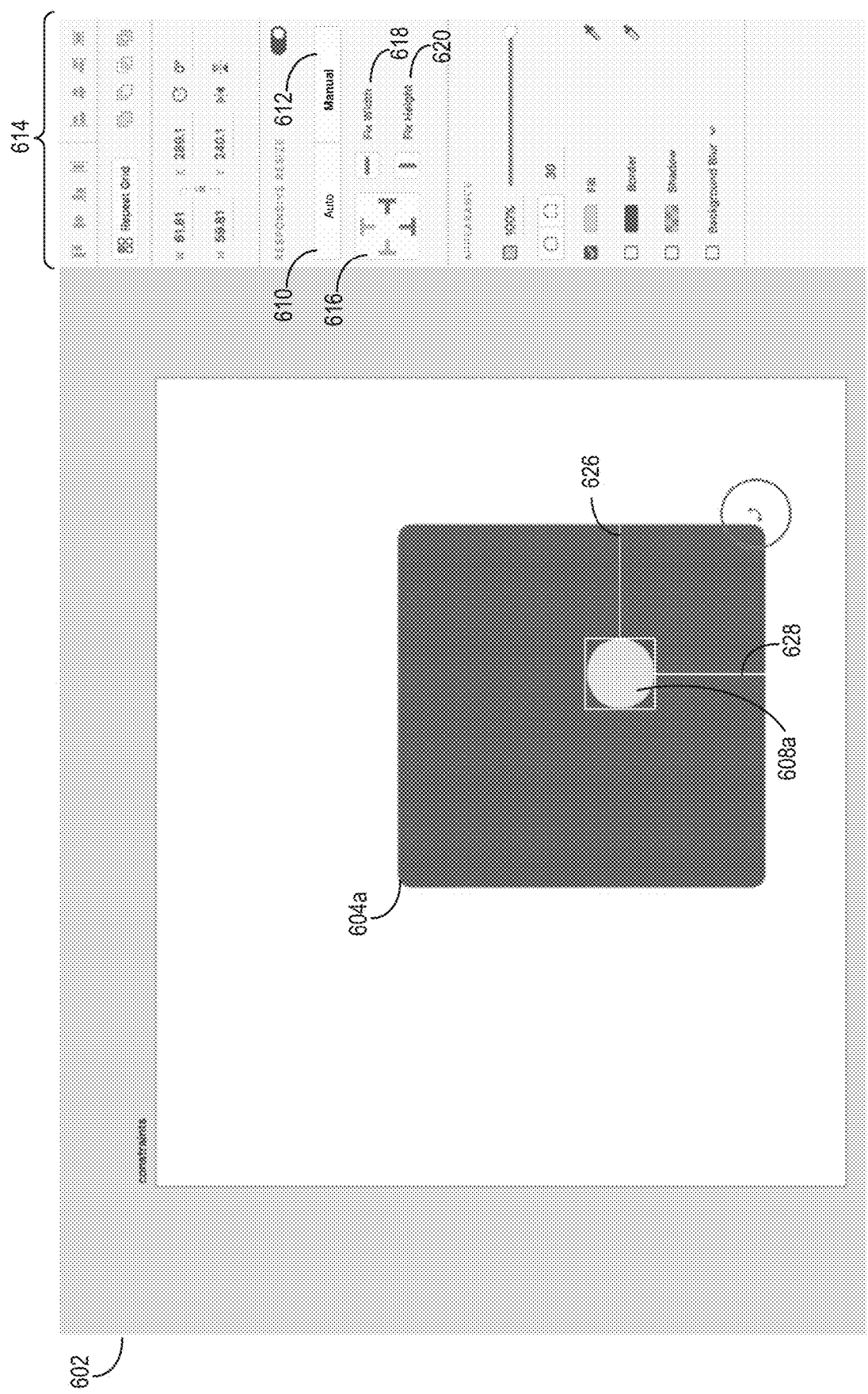

As mentioned above, the design resize constraint system can automatically apply semantic-aware resize constraints to design elements of a design layout. Additionally, the design resize constraint system can enable application of manually-selected constraints to the same design elements of the design layout. FIGS. 6A-6D illustrate a series of graphical user interfaces showing resize behaviors for a design using automatically-applied semantic-aware resize constraints and manually-selected constraints. In particular, FIGS. 6A-6B illustrate graphical user interfaces showing automatically-applied semantic-aware resize constraints. FIGS. 6C-6D illustrate graphical user interfaces showing manually-selected constraints.

FIG. 6A illustrates the resize constraint graphical user interface 602 presented by the design resize constraint system when the design resize constraint system automatically applies semantic-aware resize constraints. In particular, the resize constraint graphical user interface 602 includes a first design element 604 with a nested second design element 608. Additionally, the resize constraint graphical user interface 602 includes a customization panel 614 comprising an automatic selection element 610, a manual selection element 612, an edge constraints element 616, a width constraint element 618, and a height constraint element 620. As discussed, the first design element 604 can represent a parent design element including a nested child second design element 608. Additionally, the first design element 604 can represent a display layout that includes the second design element 608.

The design resize constraint system can highlight a selected design element and display information relevant to the selected design element. As illustrated in FIG. 6A, the design resize constraint system presents, via the resize constraint graphical user interface 602, the first design element 604 and the second design element 608 of an initial size. Based on detecting designer selection of the second design element 608, the design resize constraint system highlights the second design element 608. For example, the design resize constraint system highlights the second design element 608 using resize dots. In at least one or more other embodiments, the design resize constraint system highlights more than one design element based on detecting designer interaction with multiple design elements. For example, based on the designer's selection of multiple design elements, the design resize constraint system can present pinning overlays for and also constraints for all of the selected multiple design elements.

The design resize constraint system presents customization options for the highlighted design element. As illustrated in FIG. 6A, the design resize constraint system presents responsive resize data relevant to the selected design element using the customization panel 614. Based on designer interaction with the customization panel 614, the design resize constraint system customizes the size of the selected design elements, resize behaviors of the selected design elements, and the appearance (e.g., color, border, opacity, blur, etc.) of the selected design elements.

The design resize constraint system presents a visual representation for automatically-applied semantic-aware resize constraints using the customization panel 614. In particular, the design resize constraint system highlights the automatic selection element 610 to indicate that the constraints applied to the highlighted second design element 608 are automatically-applied semantic-aware resize constraints. Additionally, the design resize constraint system highlights the left constraint and top constraint of the edge constraints element 616 to represent that the design resize constraint system applied a left and top constraint to the second design element 608 based on design semantics. As illustrated, the design resize constraint system also highlights the width constraint element 618 and the height constraint element 620 to represent the applied width and height constraints.

Based on a designer request to resize first design element 604, the design resize constraint system updates the resize constraint graphical user interface 602 to demonstrate the resize behaviors of the second design element 608. FIG. 6B illustrates an updated first design element 604*a* with a nested updated second design element 608*a*. Additionally, the design resize constraint system presents a top pinning overlay 622 and a left pinning overlay 624.

The design resize constraint system can detect a designer request to resize a graphical user interface design layout. FIG. 6B illustrates the resize constraint graphical user interface 602 during a resizing operation of the first design element 604 and the second design element 608. As illustrated in FIG. 6B, the design resize constraint system identifies a designer selection of a corner of the first design element 604. Based on a dragging motion of the corner of the first design element 604, the design resize constraint system generates the updated first design element 604*a* and the updated second design element 608*a*. As the design resize constraint system updates the first design element 604*a* based on designer interaction with the first design element 604*a*, the design resize constraint system resizes the updated second design element 608a based on the automatically-applied semantic-aware resize constraints.

Though FIG. 6B illustrates the design resize constraint system identifying a selecting and dragging gesture as a request to resize the graphical user interface design layout, the design resize constraint system can receive additional requests to resize the design layout. In particular, a designer can interact with elements in the customization panel 614 to specify desired dimensions of the design layout. For example, based on a designer selection of the first design element 604, the design resize constraint system can update the customization panel 614 to display data relevant to the first design element 604. The designer can then enter desired resize dimensions for the first design element 604.

The design resize constraint system presents pinning overlays to show the pinning behavior of child design elements without excessive visual noise during the resizing operation. As illustrated in FIG. 6B, the design resize constraint system presents the top pinning overlay 622 and the left pinning overlay 624 to show that the updated second design element 608a has been pinned to the left and top edges of the updated first design element 604a based on a top and left constraint. In at least one other embodiment, the design resize constraint system includes width and height pinning overlays to demonstrate that the design resize constraint system has also applied a width constraint and a height constraint to the updated second design element 608a.

As discussed above, the design resize constraint system can toggle between applying automatic semantic-aware resize constraints and manually-selected constraints to design elements. FIGS. 6C-6D illustrate example resize constraint graphical user interfaces 602 that present controls and layouts for manually-selected constraints. In particular, FIG. 6C illustrates the first design element 604 and the second design element 608 of an initial size. FIG. 6D illustrates the updated first design element 604a and the updated second design element 608a during a resizing operation.

As discussed above, the design resize constraint system can present, to a designer, options for manually selecting constraints to be applied to digital elements. FIG. 6C illustrates the resize constraint graphical user interface 602 including the first design element 604 and the second design element 608. The resize constraint graphical user interface 602 includes the customization panel 614 with the automatic selection element 610, the manual selection element 612, the edge constraints element 6161, the width constraint element 618, and the height constraint element 620.

The design resize constraint system can remove automatically-applied semantic-aware resize constraints from the selected design element and apply manually-selected constraints. As illustrated in FIG. 6C, although the design resize constraint system automatically defines top, left, width, and height constraints for the second design element 608, the design resize constraint system can remove those automatically-applied semantic-aware resize constraints. For example, based on user interaction with the manual selection element 612, the design resize constraint system determines to apply manually-selected constraints to the second design element 608. In particular, the designer can select the top constraint and the left constraint of the edge constraints element 616 to remove the automatically-applied left and top constraints. Additionally, the designer can select the right constraint and the bottom constraint of the edge constraints element 616. Based on the designer interaction with the edge constraints element 616, the design resize constraint system can determine the constraints to apply to the second design element 608. Though not illustrated, the design resize constraint system can also detect designer interaction with the width constraint element 618 and the height constraint element 620 to add or remove width and height constraints.

The design resize constraint system applies the manually-selected constraints and updates the resize constraint graphical user interface 602 to include pinning overlays during the resize operation. FIG. 6D illustrates the resize constraint graphical user interface 602 with the updated first design element 604a and the updated second design element 608a. Additionally, the design resize constraint system presents a right pinning overlay 626 and a bottom pinning overlay 628. It is noted that the automatically applied width and height constraints were also applied during resizing in addition to the manually applied right and bottom constraints.

As the design resize constraint system receives a designer request to resize the first design element 604, the design resize constraint system illustrates the pinning behaviors of the second design element 608. In particular, the design resize constraint system presents the updated first design element 604a to provide real-time feedback for the request to resize the first design element 604. Additionally, the updated second design element 608a illustrates the real-time resizing behaviors of the second design element 604 based on the manually-selected restraints. For example, the design resize constraint system generates the right pinning overlay 626 and the bottom pinning overlay 628 to demonstrate pinning behaviors of the updated second design element 608a.

As shown by FIGS. 6A-6D, the design resize constraint system also provides a unique balance and workflow between auto-generated semantic-aware resize constraints and manual constraints. In particular, the design resize constraint system makes any resize operation automatically constrained by auto-generated semantic-aware resize constraints. Thus, the design resize constraint system does not need to present complex details about the constraints. If user chooses to edit the auto-generated semantic aware constraints and switches one or more to manual constraints, the design resize constraint system reveals a constraints UI pre-populated with constraints that allows a user to make edits to change the responsive behavior of that element. The design resize constraint system can then use this feedback to optimize and run heuristic algorithm to intelligently learn.

FIGS. 7A-7D illustrate pairs of example graphical user interface design layouts in an initial size and during a resizing operation. In particular, FIGS. 7A-7D illustrate that the design resize constraint system can accurately resize graphical user interface design layouts even when the design layouts include complex design elements.

Figure 7B:
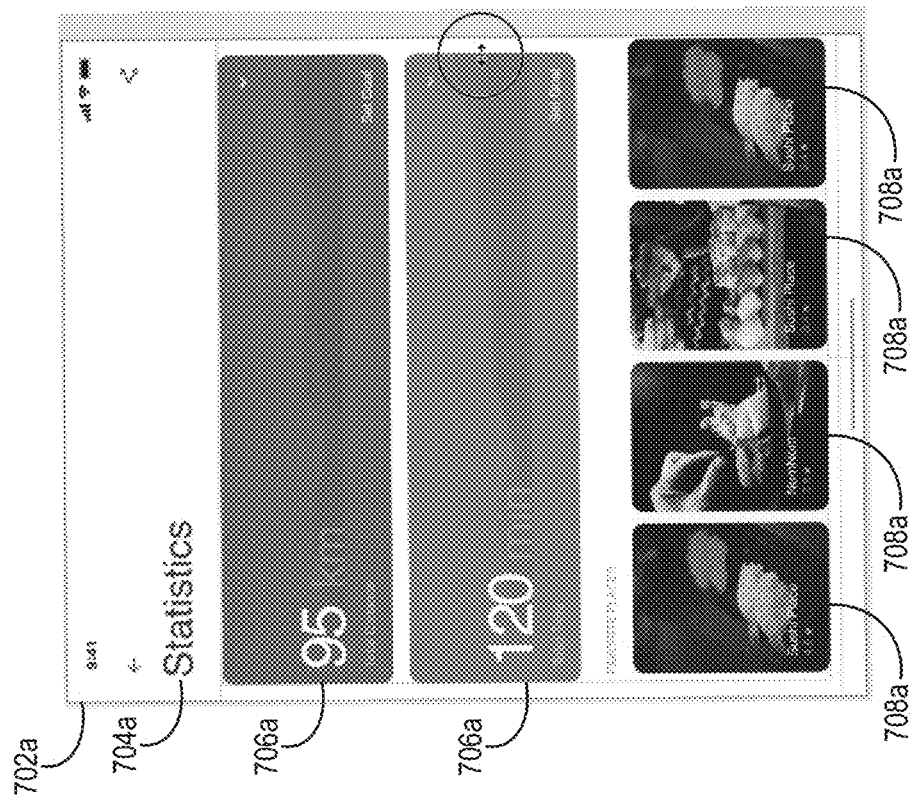
Figure 7A:
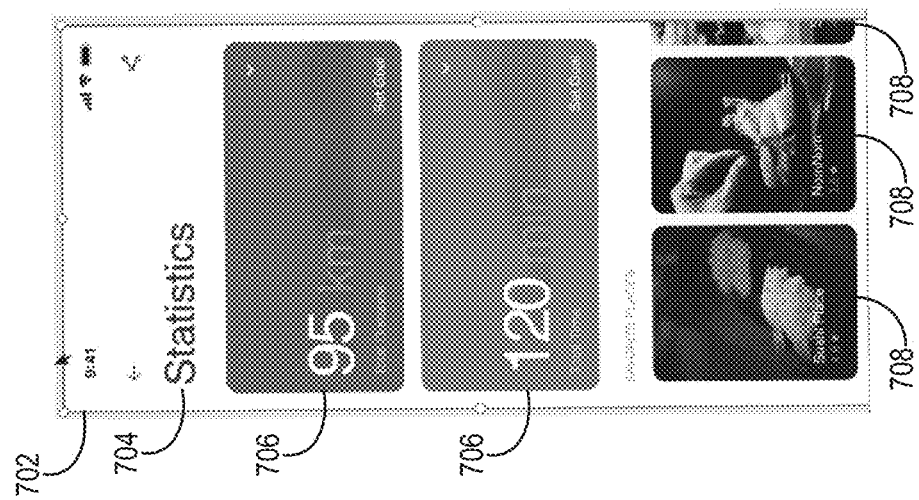

FIGS. 7A-7B illustrate the design resize constraint system resizing a design layout comprising multiple design elements. In particular, FIG. 7A illustrates a design layout 702 of an initial size. FIG. 7B illustrates an updated design layout 702a.

FIG. 7A illustrates the design layout 702 including a title element 704, text graphic elements 706, and image elements 708. Based on the analyzed design semantics of the design layout, the design resize constraint system applies semantic-aware resize constraints to each of the design elements in the design layout 702.

FIG. 7B illustrates the different constraints applied to the design elements of the design layout. In particular, FIG. 7B illustrates an updated design layout 702a including an updated title design element 704a, updated text graphic elements 706a, and updated image elements 708. The design resize constraint system applies left and right constraints to the text graphic elements 706 to generate the updated text graphic elements 706a that span the width of the updated design layout 702a. Instead of applying left and right constraints to the image elements 708, the design resize constraint system applies width constraints to the image elements 708 to generate the resized image elements 708a. Because the resized image elements 708a are fixed in width, the design resize constraint system includes additional resized image elements 708a in the updated design layout 702a that were not included in the initial design layout 702.

FIGS. 7C-7D provide additional examples of design layouts including various types of design elements. In particular, FIG. 7C illustrates a design layout 710 including a title design element 712, an interactive media element 714, and a text design element 718 of an initial size.

FIG. 7D illustrates an updated design layout 710a during a resizing operation. In particular, the updated design layout 710a includes a top pinning overlay 716a, a left pinning overlay 716b, and a right pinning overlay 716c for the updated title design element 712a. Additionally, the updated design layout 710a includes an updated interactive media element 714a and an updated text design element 718a.

The design resize constraint system can adapt individual design elements as the design elements are resized. In particular, the design resize constraint system can expand or minimize images and reconfigure text to fit text containers. For example, as illustrated in FIG. 7B, the design resize constraint system expands the interactive media element 714 to the size of the updated interactive media element 714a. The design resize constraint system maximizes the scale of the updated interactive media element 714a (i.e., blows up the media element). In at least one other embodiment, the design resize constraint system expands the borders of the updated interactive media element 714a while maintaining the same scale of the media presented within the updated interactive media element 714a. For example, the design resize constraint system can display a cropped snapshot of the interactive media element 714 in the initial size. Thus, when the design resize constraint system expands the borders of the interactive media element 714, the design resize constraint system can remove the cropping to present the updated interactive media element 714a of the same scale. Additionally, as illustrated in FIG. 7B, the design resize constraint system reformats the text in the updated title design element 712a and the updated text design element 718a to fit the boundaries of the respective elements. In additional embodiments, the design resize constraint system alters font, font size, spacing, and formatting of text design elements.

Figure 8:
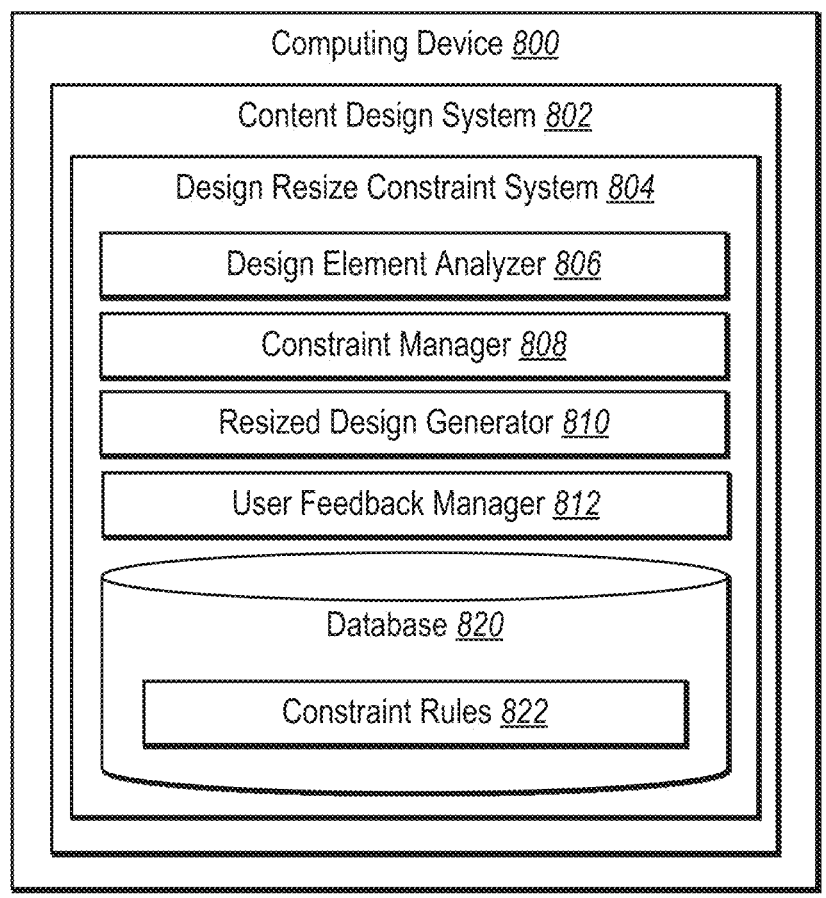
FIG. 8 illustrates a schematic diagram of a design resize constraint system in accordance with one or more embodiments.

Referring now to FIG. 8, additional detail is provided regarding capabilities and components of the design resize constraint system in accordance with one or more embodiments. In particular, FIG. 8 shows a schematic diagram of an example architecture of the design resize constraint system 804 of a content design system 802 implemented on a computing device 800. The design resize constraint system 804 can represent one or more embodiments of the design resize constraint system described previously. In one or more embodiments, some or all of the components of the design resize constraint system 804 can be implemented separately from the content design system 802. Moreover, the computing device 800 can include a variety of different devices. For example, in some embodiments, some or all of the components of the design resize constraint system 804 are implemented on a client device and/or server device.

The content design system 802, in one or more embodiments, generally facilitates the creation, modification, sharing, and/or deletion of graphical content. In one or more embodiments, the content design system 802 is a design application such as ADOBE® XD®. In other embodiments, the content design system 802 includes multiple applications, functions, and operations relating to graphical content, such as an application suite, a web-based application and/or system operations on the computing device 800.

As illustrated in FIG. 8, the design resize constraint system 804 includes various components for performing the processes and features described herein. For example, the design resize constraint system 804 includes a design element analyzer 806, a constraint manager 808, a resized design generator 810, a user feedback manager 812, and a database 820. Each of these components is described below in turn.

As mentioned above, the design resize constraint system 804 includes the design element analyzer 806. For example, in one or more embodiments, the design element analyzer 806 detects or identifies the design elements in a design. For example, the design element analyzer 806 can detect design elements and determine a type for each design element (e.g., whether the design elements are containers, text). The design element analyzer 806 detects relationships between design elements (e.g., parent child). In addition, the design element analyzer 806 detects design element offsets, sizes, relative positions etc. Additional description regarding the tasks that design element analyzer 806 performs are provided above.

As shown, the design resize constraint system 804 includes the constraint manager 808. In general, the constraint manager 808 can apply constraints to design elements based on the analysis of the design element analyzer 808 as described above. In particular, the constraint manager 808 accesses the semantic information extracted by the design element analyzer 806. The constraint manager 808 uses the heuristics rules discussed above to identify a set of semantic-aware resize constraints for each design element. Additionally, the constraint manager 808 dynamically analyzes the semantics of design elements and generates new sets of semantic-aware resize constraints as required. The constraint manager 808 also manages manually-selected constraints. In particular, the constraint manager 808 identifies whether the applied constraints are automatically-applied semantic-aware resize constraints or manually-selected constraints.

As illustrated in FIG. 8, the design resize constraint system 804 includes the resized design generator 810. In general, the resized design generator 810 receives user input to change the size of a design layout (for example, receiving user input to change a design layout or viewport from a smart phone size to a tablet size). The resized design generator 810 applies the semantic-aware resize constraints defined by the constraint manager 808 to each design element of the design layout. Based on the applied constraints (e.g., manually-selected or automatically-applied) and the received request to resize, the resized design generator 810 generates a resized design layout with resized design elements.

The design resize constraint system 804 also includes the user feedback manager 812. In general, the user feedback manager 812 manages presenting a resize constraint graphical user interface, detecting interaction with the resize constraint graphical user interface, and adapting the design layout based on detected designer interaction with the resize constraint graphical user interface. The user feedback manager 812 can allow a user to modify, shape, deform, and/or manipulate the shape/size of a design (or design elements). In particular, the user feedback manager 812 presents pinning overlays that show resize behaviors of design elements based on constraints. Additionally, the user feedback manager 812 presents, to the designer, an option to toggle between applying automatic semantic-aware resize constraints and manually-selected constraints.

The design resize constraint system 804 also includes the database 820. The database includes constraint rules 822 (e.g., the heuristics described above in relation to FIGS. 4A and 4B). The constraint rules 822 can include a set of constraint rules used to identify the appropriate semantic-aware resize constraints to design elements based on design semantics. More specifically, the constraint rules 822 include the rules discussed above with respect to FIGS. 4A-4B.

Each of the components 806-820 of the design resize constraint system 804 can include software, hardware, or both. For example, the components 806-820 can include one or more instructions stored on a computer-readable storage medium and executable by processors of one or more computing devices, such as a client device (e.g., a mobile client device) or server device. When executed by the one or more processors, the computer-executable instructions of the design resize constraint system 804 can cause a computing device to perform the resized graphical user interface generation as described herein. Alternatively, the components 806-820 can include hardware, such as a special-purpose processing device to perform a certain function or group of functions. In addition, the components 806-820 of the design resize constraint system 804 can include a combination of computer-executable instructions and hardware.

Furthermore, the components 806-820 of the design resize constraint system 804 may be implemented as one or more operating systems, as one or more stand-alone applications, as one or more modules of an application, as one or more plug-ins, as one or more library functions or functions that may be called by other applications, and/or as a cloud-computing model. Thus, the components 806-820 may be implemented as a stand-alone application, such as a desktop or mobile application. Additionally, the components 806-820 may be implemented as one or more web-based applications hosted on a remote server. The components 806-820 may also be implemented in a suite of mobile device applications or "apps." To illustrate, the components 806-820 may be implemented in an application, including but not limited to ADOBE® INDESIGN®, ADOBE ACROBAT®, ADOBE® ILLUSTRATOR®, ADOBE PHOTOSHOP®, ADOBE® CREATIVE CLOUD® software. "ADOBE," "INDESIGN" "ACROBAT," "ILLUSTRATOR," "PHOTOSHOP," and "CREATIVE CLOUD" are either registered trademarks or trademarks of Adobe Inc. in the United States and/or other countries.

Figure 9:
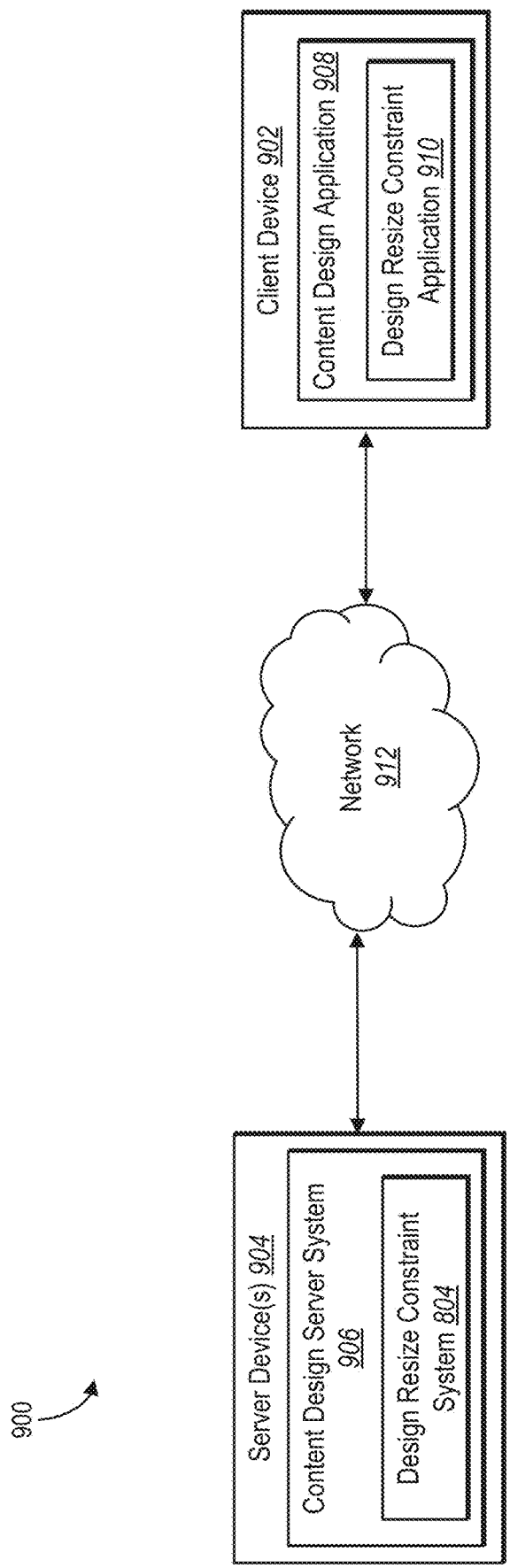
FIG. 9 illustrates an example environment for implementing a design resize constraint system in accordance with one or more embodiments.

FIG. 9 illustrates a schematic diagram of an environment 900 in which the design resize constraint system 804 may be implemented in accordance with one or more embodiments. As shown in FIG. 9, the environment 900 includes various computing devices including server device(s) 904 and one or more client devices 902. In addition, the environment 900 includes a network 912. The network 912 may be any suitable network over which the computing devices can communicate. Example networks are discussed in more detail below with regard to FIG. 11.

As shown, the environment 900 includes the client device 902. The client device 902 may comprise various types of client devices. For example, in some embodiments, the client device 902 includes a mobile device, such as a laptop, a tablet, a mobile telephone, a smartphone, etc. In other embodiments, the client device 902 includes a non-mobile device, such as a desktop or server, or another type of client device. Additional details with regard to the client device 902 are discussed below with respect to FIG. 11.

As illustrated in FIG. 9, the environment 900 includes the server device(s) 904. The server device(s) 904 can receive, store, generate, and/or transmit any type of data, including design layouts. For example, the server device(s) 904 can receive, store, and resize a design layout from the client device 902 and transmit the resized design layout to the client device 902. In one or more embodiments, the server device(s) 904 comprise a data server. The server device(s) 904 can also comprise a communication server or a web-hosting server. Additional detail regarding the server device(s) 904 are provided below in relation to FIG. 11.

While not illustrated, in one or more embodiments, the server device(s) 904 can also include all, or a portion of, the design resize constraint system 804, such as within the content design server system 906. For example, when located in the server device(s) 904, the design resize constraint system 804 can comprise a design resize constraint application running on the server device(s) 904 or a portion of a software application that can be downloaded to the client device 902. For instance, the design resize constraint system 804 includes a web hosting application that allows the client device 902 to interact with content from the content design server system 906 hosted on the server device(s) 904. In this manner, the server device(s) 904 can perform design layout resizing based on input from the client device 902.

As illustrated in FIG. 9, the client device 902 includes a content design application 908 and the design resize constraint application 910. In particular, the design resize constraint application 910 can include all, or a portion of, the design resize constraint system 804. Additionally, the design resize constraint application 910 can also allow the client device 902 to interact with content from the content design server system 906 hosted on the server device(s) 904. Thus, the design resize constraint application 910 allows the client device 902 to perform design layout resizing.

Although FIG. 9 illustrates a particular arrangement of the server device(s) 904, the client device 902 and the network 912, various additional arrangements are possible. For example, while FIG. 9 illustrates the one or more client device 902 communicating with the server device(s) 904 via the network 912, in one or more embodiments a single client device may communicate directly with the server device(s) 904, bypassing the network 912.

Similarly, although the environment 900 of FIG. 9 is depicted as having various components, the environment 900 may have additional or alternative components. For example, the design resize constraint system 804 can be implemented on multiple computing devices. In particular, the design resize constraint system 804 may be implemented in whole by the server device(s) 904 or the design resize constraint system 804 may be implemented in whole by the client device 902. Alternatively, the design resize constraint system 804 may be implemented across multiple devices or components (e.g., utilizing the server device(s) 904 and the one or more client device 902).

Figure 10:
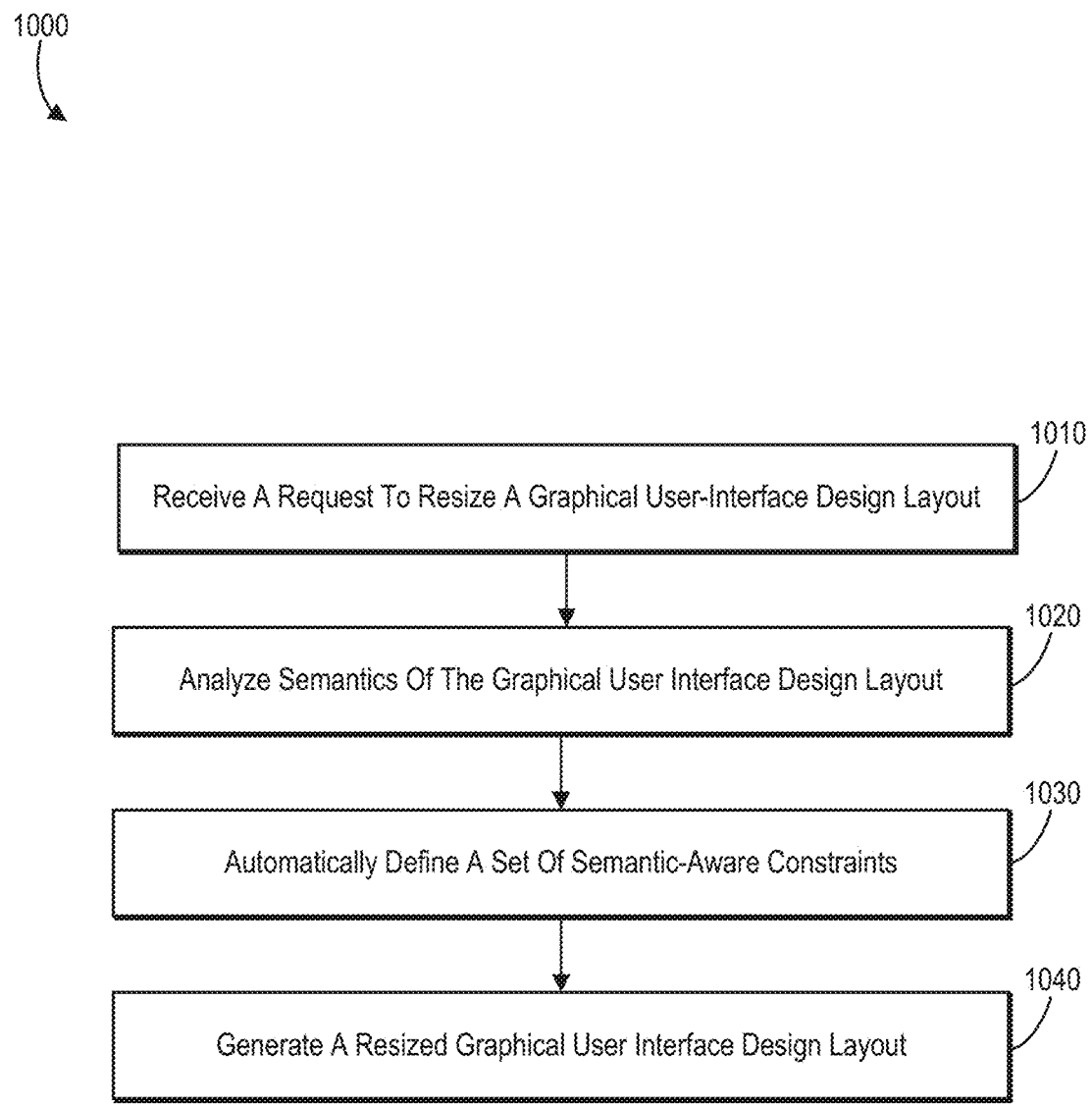
FIG. 10 illustrates a flowchart of a series of acts for automatic semantic-aware constraint application in accordance with one or more embodiments.

FIGS. 1-9, the corresponding text, and the examples provide a number of different methods, systems, devices, and non-transitory computer-readable media of the design resize constraint system 804. In addition to the foregoing, one or more embodiments can also be described in terms of flowcharts comprising acts for accomplishing a particular result, such as the flowcharts of acts shown in FIG. 9. Additionally, the acts described herein may be repeated or performed in parallel with one another or parallel with different instances of the same or similar acts. For example, FIG. 10 illustrates a flowchart of a series of acts 1000 for generating a resized graphical user interface design layout in accordance with one or more embodiments. While FIG. 10 illustrates acts according to one embodiment, alternative embodiments may omit, add to, reorder, and/or modify any of the acts shown in FIG. 10. The acts of FIG. 10 can be performed as part of a method. Alternatively, a non-transitory computer readable medium can comprise instructions that, when executed by one or more processors, cause a computing device to perform the acts of FIG. 10. In still further embodiments, a system can perform the acts of FIG. 10.

As illustrated in FIG. 10, the series of acts 1000 can comprise an act 1010 of receiving a request to resize a graphical user interface design layout. For example, act 1010 can comprise receiving a request to resize a graphical user interface design layout from a first size to a second size, the graphical user interface design layout comprising a plurality of graphical user interface elements. The second size can be larger or smaller than the first size and have the same shape or a different shape than the first size.

The series of acts 1000 can also include an act 1020 of analyzing semantics of the graphical user interface design layout. For example, act 1020 can comprise identifying a hierarchy of graphical user interface elements, determining a type of the graphical user interface elements, and/or identifying relative positioning among the graphical user interface elements. More particularly, act 1020 can involve identifying parent and child relationships between the graphical user interface elements of the graphical user interface design layout. Act 1020 can also involve identifying offsets between edges of child graphical user interface elements and corresponding edges of parent graphical user interface elements. Additionally, act 1020 can comprise identifying types of the graphical user interface elements. For example, act 1020 can involve determining whether graphical user interface elements are text, single lines, nested, etc.

Additionally, the act 1020 can involve identifying a set of element edges of a graphical user interface element of the plurality of graphical user interface elements; and identifying a set of design layout edges of the graphical user interface design layout. Additionally, the act 1020 can involve measuring an offset length, wherein the offset length comprises a distance between an element edge of the set of element edges and a corresponding design layout edge of the set of design layout edges. Act 1020 can further include determining a length of the graphical user interface element between opposing element edges of the set of element edges and determining a corresponding length of the graphical user interface design layout between corresponding opposing design layout edges of the set of design layout edges.

The series of acts 1000 can comprise an act 1030 of automatically defining a set of semantic-aware resize constraints. In particular, act 1030 includes automatically define a set of semantic-aware resize constraints for the plurality of graphical user interface elements based on the analyzed semantics of the graphical user interface design layout. Specially, act 1030 can involve applying the heuristics system to the analyzed semantics of the graphical user interface design layout. For example, act 1030 can involve determining that an offset length is less than a threshold proportion of the graphical user interface design layout; and based on the determination that the offset length is less than the threshold proportion of the design layout, defining an edge semantic-aware constraint by pinning the element edge to the corresponding design layout edge. Act 1030 can also involve determining that the length of a graphical user interface element meets a threshold proportion of the corresponding length of the graphical user interface design layout and based on determining that the length of the graphical user interface element meets the threshold proportion, defining an opposing edges semantic-aware constraint by pinning each opposing element edge of the pair of opposing element edges to a corresponding opposing design layout edge of the opposing design layout edges. Act 1030 can involve determining that neither opposing edge of a pair of opposing element edges is pinned to a set of corresponding opposing design layout edges, and based on the determination that neither opposing edge of the pair of opposing element edges is pinned to the set of corresponding opposing design layout edges, setting a length semantic-aware constraint on the graphical user interface elements. Additionally, act 1030 can involve determining that an offset length for a child graphical user interface element is less than a threshold proportion of a corresponding parent graphical user interface element; and based on the determination that the offset length is less than the threshold proportion, defining an edge semantic-aware constraint by pinning an edge of the child graphical user interface element to a corresponding edge of the parent graphical user interface element. Act 1030 can also involve detecting a user change to one or more graphical user interface elements of the graphical user interface design layout prior to resizing of the graphical user interface design layout; and dynamically updating the set of semantic-aware resize constraints based on the user change to the one or more graphical user interface elements.

The series of acts 1000 also includes act 1040 of generating a resized graphical user interface design layout. In particular, act 1040 can comprise generating a resized graphical user interface design layout of the second size by resizing the plurality of graphical user interface elements in accordance with the automatically defined set of semantic-aware resize constraints.

The series of acts 1000 can also include the act of generating, for display at a designer device, a design resize interface comprising the graphical user interface design layout, the plurality of graphical user interface elements, pinning overlays representing the set of semantic-aware resize constraints, an automatic constraint element, and a manual constraint element. This act can also include presenting, via the design resize interface, a set of automatic pinning overlays representing the set of semantic-aware resize constraints. Additionally, this act can include detecting user interaction with the manual constraint element; and based on the user interaction with the manual constraint element, presenting, via the graphical user interface element, a set of manual constraints. This act can further include detecting a designer selection of at least one of the set of manual constraints; update the design resize interface to present a set of manual pinning overlays representing the at least one of the set of manual constraints; and based on the detected designer interaction, generate a manually resized graphical user interface design layout of the second size by resizing the plurality of graphical user interface elements in accordance with the at least one of the set of manual constraints.

The series of acts can also involve present an automatic pinning overlay representing the edge semantic-aware constraint during resizing and removing the automatic pinning overlay representing the edge semantic-aware constraint after generation of the resized graphical user interface design layout.

In addition (or in the alternative) to the acts described above, in some embodiments, the acts 1000 include performing a step for analyzing semantics of the graphical user interface design layout and performing a step for automatically defining a set of semantic-aware resize constraints for the plurality of graphical user interface elements based on the analyzed semantics of the graphical user interface design layout. For example, the acts described in reference to FIGS. 2, 3A-3F can comprise the corresponding acts for performing a step for analyzing semantics of the graphical user interface design layout. Additionally, FIGS. 4A-4B and the associated description comprise the corresponding acts for performing a step for automatically defining a set of semantic-aware resize constraints for the plurality of graphical user interface elements based on the analyzed semantics of the graphical user interface design layout.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
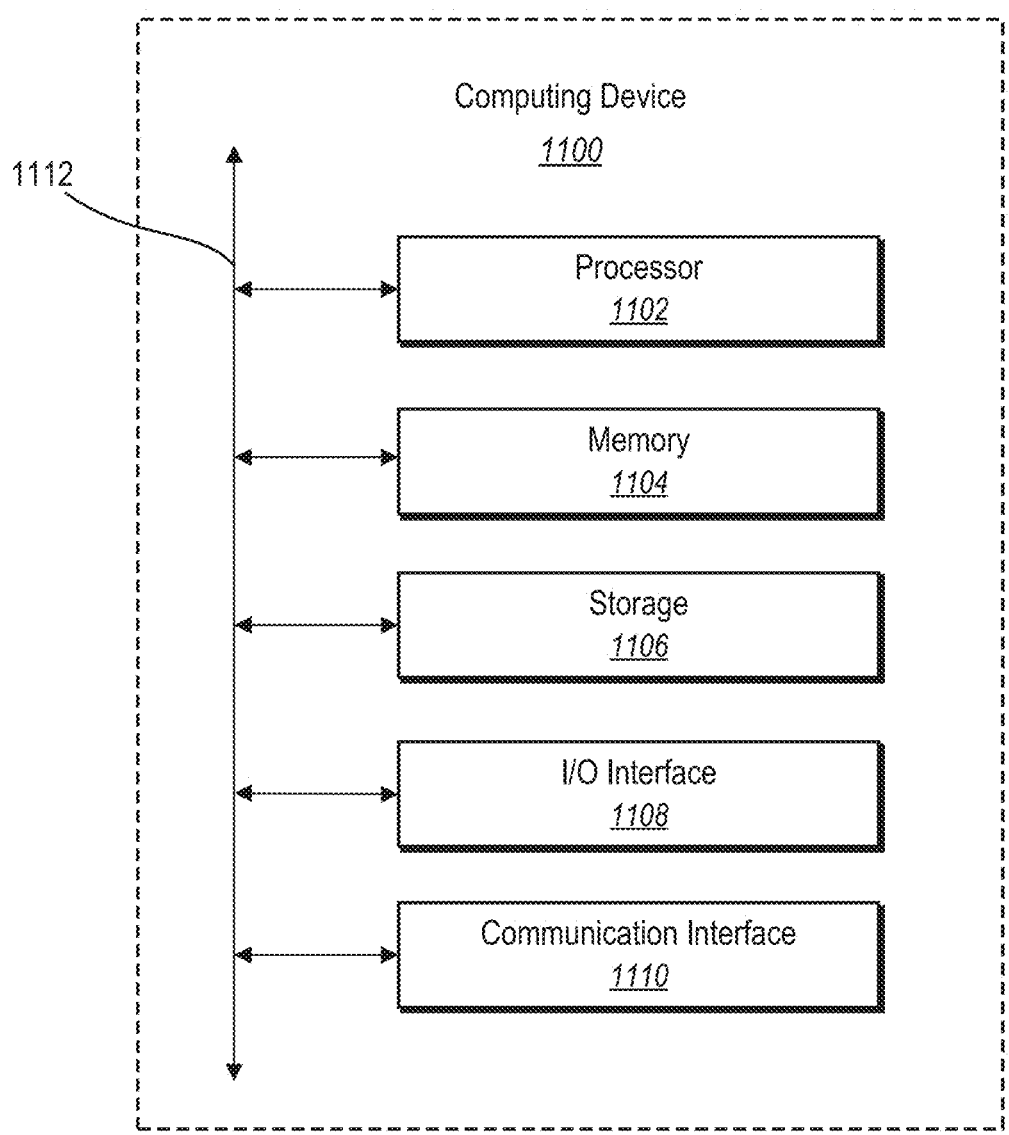
FIG. 11 illustrates a block diagram of an example computing device in accordance with one or more embodiments.

FIG. 11 illustrates, in block diagram form, an example computing device 1100 (e.g., computing device 800, client device 902, and/or server device(s) 904) that may be configured to perform one or more of the processes described above. One will appreciate that the design resize constraint system 804 can comprise implementations of the computing device 1100. As shown by FIG. 11, the computing device can comprise a processor 1102, memory 1104, a storage device 1106, an I/O interface 1108, and a communication interface 1110. Furthermore, the computing device 1100 can include an input device such as a touchscreen, mouse, keyboard, etc. In certain embodiments, the computing device 1100 can include fewer or more components than those shown in FIG. 11. Components of computing device 1100 shown in FIG. 11 will now be described in additional detail.

In particular embodiments, processor(s) 1102 includes hardware for executing instructions, such as those making up a computer program. As an example, and not by way of limitation, to execute instructions, processor(s) 1102 may retrieve (or fetch) the instructions from an internal register, an internal cache, memory 1104, or a storage device 1106 and decode and execute them.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1404 may be internal or distributed memory.

The computing device 1100 includes a storage device 1106 includes storage for storing data or instructions. As an example, and not by way of limitation, storage device 1106 can comprise a non-transitory storage medium described above. The storage device 1106 may include a hard disk drive (HDD), flash memory, a Universal Serial Bus (USB) drive or a combination of these or other storage devices.

The computing device 1100 also includes one or more input or output ("I/O") devices/interfaces 1108, which are provided to allow a user to provide input to (such as user strokes), receive output from, and otherwise transfer data to and from the computing device 1100. These I/O devices/interfaces 1108 may include a mouse, keypad or a keyboard, a touch screen, camera, optical scanner, network interface, modem, other known I/O devices or a combination of such I/O devices/interfaces 1108. The touch screen may be activated with a writing device or a finger.

The I/O devices/interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1108 is configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 can provide one or more interfaces for communication (such as, for example, packet-based communication) between the computing device and one or more other computing devices 1100 or one or more networks. As an example, and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can comprise hardware, software, or both that couples components of computing device 1100 to each other.

In the foregoing specification, the invention has been described with reference to specific example embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer readable medium storing instructions thereon that, when executed by at least one processor, cause a computing device to:
provide, for display via a designer device, a graphical user interface design layout in a first size;
receive a request to resize a graphical user interface design layout from a first size to a second size, the graphical user interface design layout comprising a plurality of graphical user interface elements;
analyze semantics of the graphical user interface design layout;
automatically define a set of edge semantic-aware constraints for the plurality of graphical user interface elements based on the analyzed semantics of the graphical user interface design layout, wherein the set of edge semantic-aware constraints comprise at least one of a top constraint, a bottom constraint, a left constraint, or a right constraint, and wherein each edge semantic-aware constraint defines a fixed distance between an edge of an associated graphical user interface element and an adjacent edge;
generate a resized graphical user interface design layout of the second size by resizing the plurality of graphical user interface elements in accordance with the automatically defined set of edge semantic-aware constraints;

during resizing of the plurality of graphical user interface elements from the first size to the second size, provide an intermediate sized layout of the graphical user interface design layout to the designer device that selectively reveals edge pinning overlays indicating the set of edge semantic-aware constraints for the plurality of graphical user interface elements; and upon generation of the resized graphical user interface design layout, provide the resized graphical user interface design layout of the second size to the designer device without the edge pinning overlays.

2. The non-transitory computer readable medium of claim 1, further comprising instructions that, when executed by the at least one processor, cause the computing device to generate, for display at the designer device, a resize constraint graphical user interface comprising the graphical user interface design layout having a manual constraint element and the plurality of graphical user interface elements that are automatically constrained by the set of edge semantic-aware constraints.

3. The non-transitory computer readable medium of claim 2, further comprising instructions that, when executed by the at least one processor, cause the computing device to provide, for display via the resize constraint graphical user interface, the graphical user interface design layout in the intermediate size based on detecting user input from the designer device selecting and dragging an edge of the graphical user interface design layout.

4. The non-transitory computer readable medium of claim 1, further comprising instructions that, when executed by the at least one processor, cause the computing device to selectively reveal the edge pinning overlays indicating the set of edge semantic-aware constraints for the plurality of graphical user interface elements within the intermediate sized layout of the graphical user interface design layout apart from displaying other layout constraint overlays.

5. The non-transitory computer readable medium of claim 1, further comprising instructions that, when executed by the at least one processor, cause the computing device to selectively reveal the edge pinning overlays indicating the set of edge semantic-aware constraints for the plurality of graphical user interface elements within the intermediate sized layout of the graphical user interface design layout without user input to individual elements of the plurality of graphical user interface elements.

6. The non-transitory computer readable medium of claim 1, further comprising instructions that, when executed by the at least one processor, cause the computing device to analyze the semantics of the graphical user interface design layout by:

identifying a set of element edges of the graphical user interface element of the plurality of graphical user interface elements; and identifying a set of design layout edges of the graphical user interface design layout.

7. The non-transitory computer readable medium of claim 6, further comprising instructions that, when executed by the at least one processor, cause the computing device to define the set of edge semantic-aware constraints by:

measuring an offset length, wherein the offset length comprises a distance between an element edge of the set of element edges and a corresponding design layout edge of the set of design layout edges;

determining that the offset length is less than a threshold proportion of the graphical user interface design layout; and based on the determination that the offset length is less than the threshold proportion of the graphical user interface design layout, defining an edge semantic-aware constraint by pinning the element edge to the corresponding design layout edge.

8. The non-transitory computer readable medium of claim 6, further comprising instructions that, when executed by the at least one processor, cause the computing device to define the set of edge semantic-aware constraints by:

determining a length of the graphical user interface element between a pair of opposing element edges of the set of element edges;

determining a corresponding length of the graphical user interface design layout between corresponding opposing design layout edges of the set of design layout edges;

determining that the length of the graphical user interface element meets a threshold proportion of the corresponding length of the graphical user interface design layout; and based on determining that the length of the graphical user interface element meets the threshold proportion, defining an opposing edges semantic-aware constraint by pinning each opposing element edge of the pair of opposing element edges to a corresponding opposing design layout edge of the opposing design layout edges.

9. The non-transitory computer readable medium of claim 6, further comprising instructions that, when executed by the at least one processor, cause the computing device to define a set of size semantic-aware constraints by:

determining that neither opposing edge of a pair of opposing element edges of the graphical user interface element is pinned to a set of corresponding opposing design layout edges; and based on the determination that neither opposing edge of the pair of opposing element edges of the graphical user interface element is pinned to the set of corresponding opposing design layout edges, setting a width semantic-aware constraint on the graphical user interface element.

10. The non-transitory computer readable medium of claim 1, further comprising instructions that, when executed by the at least one processor, cause the computing device to analyze the semantics of the graphical user interface design layout by determining types of graphical user interface elements of the plurality of graphical user interface elements.

11. A system comprising:

at least one processor;

a heuristics system comprising rules for generating constraints; and a computer readable storage medium storing instructions that, when executed by the at least one processor, cause the system to:

provide, for display via a designer device, a graphical user interface design layout in a first size;

receive a request to resize a graphical user interface design layout from a first size to a second size, the graphical user interface design layout comprising a plurality of graphical user interface elements;

analyze semantics of the graphical user interface design layout by:

identifying a hierarchy of graphical user interface elements;

determining a type of the graphical user interface elements; and identifying relative positioning among the graphical user interface elements within the hierarchy of graphical user interface elements;

automatically define a set of edge semantic-aware constraints for each element in the plurality of graphical user interface elements based on the analyzed semantics of the graphical user interface design layout, wherein the set of edge semantic-aware constraints comprise at least one of a top edge constraint, a bottom edge constraint, a left edge constraint, or a right edge constraint, and wherein each edge semantic-aware constraint defines a fixed distance between an edge of each element of the plurality of graphical user interface elements and an adjacent edge;

generate a resized graphical user interface design layout of the second size by resizing the plurality of graphical user interface elements by maintaining the fixed distance between the edge of each element of the plurality of graphical user interface elements and the adjacent edge as indicated in the automatically defined set of edge semantic-aware constraints;

during resizing of the plurality of graphical user interface elements from the first size to the second size, provide an intermediate sized layout of the graphical user interface design layout to the designer device that temporarily reveals edge pinning overlays indicating the set of edge semantic-aware constraints for the plurality of graphical user interface elements; and upon generation of the resized graphical user interface design layout, provide the resized graphical user interface design layout of the second size to the designer device without layout overlays including the edge pinning overlays.

12. The system of claim 11, wherein the instructions, when executed by the at least one processor, cause the system to identify the hierarchy of graphical user interface elements by identifying parent and child relationships between the graphical user interface elements of the graphical user interface design layout.

13. The system of claim 11, wherein the instructions, when executed by the at least one processor, cause the system to identify relative positioning among the graphical user interface elements by identifying offsets between edges of child graphical user interface elements and corresponding edges of parent graphical user interface elements.

14. The system of claim 13, wherein the instructions, when executed by the at least one processor, cause the system to define the set of edge semantic-aware constraints by:

determining that an offset length for a child graphical user interface element is less than a threshold proportion of a corresponding parent graphical user interface element; and based on the determination that the offset length is less than the threshold proportion, defining an edge semantic-aware constraint by pinning an edge of the child graphical user interface element to a corresponding edge of the parent graphical user interface element.

15. The system of claim 14, further comprising instructions, that when executed by the at least one processor, cause the system to reveal an automatic pinning overlay in the first size of the graphical user interface design layout based on detecting user input requesting display of the automatic pinning overlay.

16. The system of claim 15, further comprising instructions, that when executed by the at least one processor, cause the system to remove the automatic pinning overlay representing the edge semantic-aware constraint after generation of the resized graphical user interface design layout to the second size.

17. The system of claim 11, further comprising instructions, that when executed by the at least one processor, cause the system to:

detect a user change to one or more graphical user interface elements of the graphical user interface design layout prior to resizing of the graphical user interface design layout; and dynamically update, without displaying the edge pinning overlays in the first size of the graphical user interface design layout, a set of semantic-aware resize constraints comprising the set of edge semantic-aware constraints and a set of size semantic-aware constraints based on the user change to the one or more graphical user interface elements.

18. In a digital media environment for analyzing and resizing graphical displays, a method of semantic-aware constraint selection comprising:

receiving a request to resize a graphical user interface design layout from a first size to a second size, the graphical user interface design layout comprising a plurality of graphical user interface elements;

a step for analyzing semantics of the graphical user interface design layout;

a step for automatically defining a set of semantic-aware resize constraints for the plurality of graphical user interface elements based on the analyzed semantics of the graphical user interface design layout;

generating a resized graphical user interface design layout of the second size by resizing the plurality of graphical user interface elements in accordance with the automatically defined set of semantic-aware resize constraints;

during resizing of the plurality of graphical user interface elements from the first size to the second size, providing an intermediate sized layout of the graphical user interface design layout that selectively reveals edge pinning overlays indicating the set of edge semantic-aware constraints for the plurality of graphical user interface elements; and upon generation of the resized graphical user interface design layout, providing the resized graphical user interface design layout of the second size without layout overlays including the edge pinning overlays.

19. The method of claim 18, further comprising generating, for display at a designer device, a design resize interface comprising the graphical user interface design layout having a manual constraint element and the plurality of graphical user interface elements that are automatically constrained by the set of edge semantic-aware constraints.

20. The method of claim 18, further comprising changing one or more automatic constraints of the automatically defined set of semantic-aware resize constraints based in user selection of a manual constraint element.

* * * * *